US008931977B2

(12) United States Patent
Connors et al.

(10) Patent No.: US 8,931,977 B2
(45) Date of Patent: Jan. 13, 2015

(54) PIPE STAND

(75) Inventors: Geoff Weyman Connors, London (CA); James Andrew Blokker, London (CA)

(73) Assignee: Pipesak Inc., London, Ontario (CA)

( * ) Notice: Subject to any disclaimer, the term of this patent is extended or adjusted under 35 U.S.C. 154(b) by 0 days.

(21) Appl. No.: 13/700,082

(22) PCT Filed: Jul. 26, 2011

(86) PCT No.: PCT/CA2011/050456
§ 371 (c)(1),
(2), (4) Date: Nov. 26, 2012

(87) PCT Pub. No.: WO2012/012898
PCT Pub. Date: Feb. 2, 2012

(65) Prior Publication Data
US 2013/0115010 A1 May 9, 2013

Related U.S. Application Data

(60) Provisional application No. 61/368,104, filed on Jul. 27, 2010.

(51) Int. Cl.
F16L 1/06 (2006.01)
F16L 3/02 (2006.01)
B23K 37/053 (2006.01)
F16L 1/028 (2006.01)

(52) U.S. Cl.
CPC ............... *F16L 3/02* (2013.01); *B23K 37/0533* (2013.01); *F16L 1/06* (2013.01); *F16L 1/028* (2013.01)
USPC ...................................... 405/184.4

(58) Field of Classification Search
USPC ........ 405/184.4; 248/49, 55, 65, 68.1, 69, 66, 248/74.1, 73; D8/354, 356; 52/677, 682, 52/683, 687, 689, 80.1, 83, 577
See application file for complete search history.

(56) References Cited

U.S. PATENT DOCUMENTS

| 675,104 | A | * | 5/1901 | Oberle ............................ 248/49 |
| 2,792,164 | A | * | 5/1957 | Cauffiel ........................ 182/194 |
| D201,670 | S | * | 7/1965 | Moore .......................... D30/130 |

(Continued)

FOREIGN PATENT DOCUMENTS

| AU | 718647 B2 | 4/2000 |
| CA | 2023045 A1 | 2/1992 |

(Continued)

OTHER PUBLICATIONS

Corrected international Preliminary Report for parent application PCT/CA2011/050456, having a completion date of Jan. 22, 2013.

(Continued)

*Primary Examiner* — Thomas B Will
*Assistant Examiner* — Jessica H Lutz
(74) *Attorney, Agent, or Firm* — Andrus Intellectual Property Law, LLP

(57) ABSTRACT

A pipe support has an outer tubular support wall, an inner tubular support wall, spaced inwardly from the outer tubular support wall, and a connecting portion for maintaining the outer tubular support wall and the inner tubular support wall in a fixed, spaced apart relationship. The pipe support is intended for use in-trench and out-of-trench for supporting a pipeline during assembly, installation, testing and operation.

9 Claims, 28 Drawing Sheets

(56) References Cited

U.S. PATENT DOCUMENTS

| | | | |
|---|---|---|---|
| 3,259,157 A | 7/1966 | Runnion | |
| 3,830,032 A * | 8/1974 | Robb | 52/687 |
| 4,573,632 A * | 3/1986 | Scheeren | 220/657 |
| 4,655,023 A * | 4/1987 | Yung | 52/685 |
| 4,899,963 A * | 2/1990 | Murphy | 248/65 |
| 5,549,210 A * | 8/1996 | Cheng | 215/375 |
| 6,327,822 B1* | 12/2001 | Il Grande | 52/80.1 |
| 6,520,456 B1 | 2/2003 | Neider et al. | |
| 6,536,717 B2* | 3/2003 | Parker | 248/49 |
| D478,246 S * | 8/2003 | Villano et al. | D7/359 |
| 6,941,705 B2* | 9/2005 | Pontarolo | 52/80.1 |
| D526,837 S * | 8/2006 | Henry et al. | D7/359 |
| 7,278,613 B2* | 10/2007 | Roy | 248/49 |
| 7,441,731 B2* | 10/2008 | Smart et al. | 248/74.1 |
| D579,712 S * | 11/2008 | Simon et al. | D7/359 |
| 7,607,619 B2* | 10/2009 | Smart et al. | 248/74.1 |
| 7,661,240 B2* | 2/2010 | Sargent | 52/677 |
| 7,798,920 B1* | 9/2010 | Cortes | 473/440 |
| D629,533 S * | 12/2010 | Ward et al. | D25/199 |
| 7,921,612 B2* | 4/2011 | Knight et al. | 52/126.6 |
| D641,534 S * | 7/2011 | Lee et al. | D34/31 |
| D649,434 S * | 11/2011 | Lalancette et al. | D8/354 |
| 8,132,771 B2* | 3/2012 | Lee et al. | 248/346.02 |
| 8,524,349 B2* | 9/2013 | Protais et al. | 428/66.3 |
| 2003/0218103 A1 | 11/2003 | Connors | |
| 2006/0131469 A1 | 6/2006 | Roy | |
| 2007/0045482 A1 | 3/2007 | Smart et al. | |
| 2007/0187564 A1* | 8/2007 | McGuire | 248/346.5 |
| 2008/0028718 A1* | 2/2008 | Erickson et al. | 52/687 |
| 2013/0068899 A1* | 3/2013 | Richter | 248/65 |

FOREIGN PATENT DOCUMENTS

| | | | |
|---|---|---|---|
| JP | 06017971 A * | 1/1994 | F16L 3/02 |
| WO | WO 9001600 A1 * | 2/1990 | E04C 5/16 |
| WO | 03/069203 A1 | 8/2003 | |
| WO | 03069203 | 8/2003 | |

OTHER PUBLICATIONS

International Preliminary Report for parent pplication PCT/CA2011/050456, having a completion of Nov. 23, 2012.

International Search Report for parent application PCT/CA2011/050456, having a mailing date of Oct. 18, 2011.

Search Report for EP11811701 dated Apr. 29, 2014.

* cited by examiner

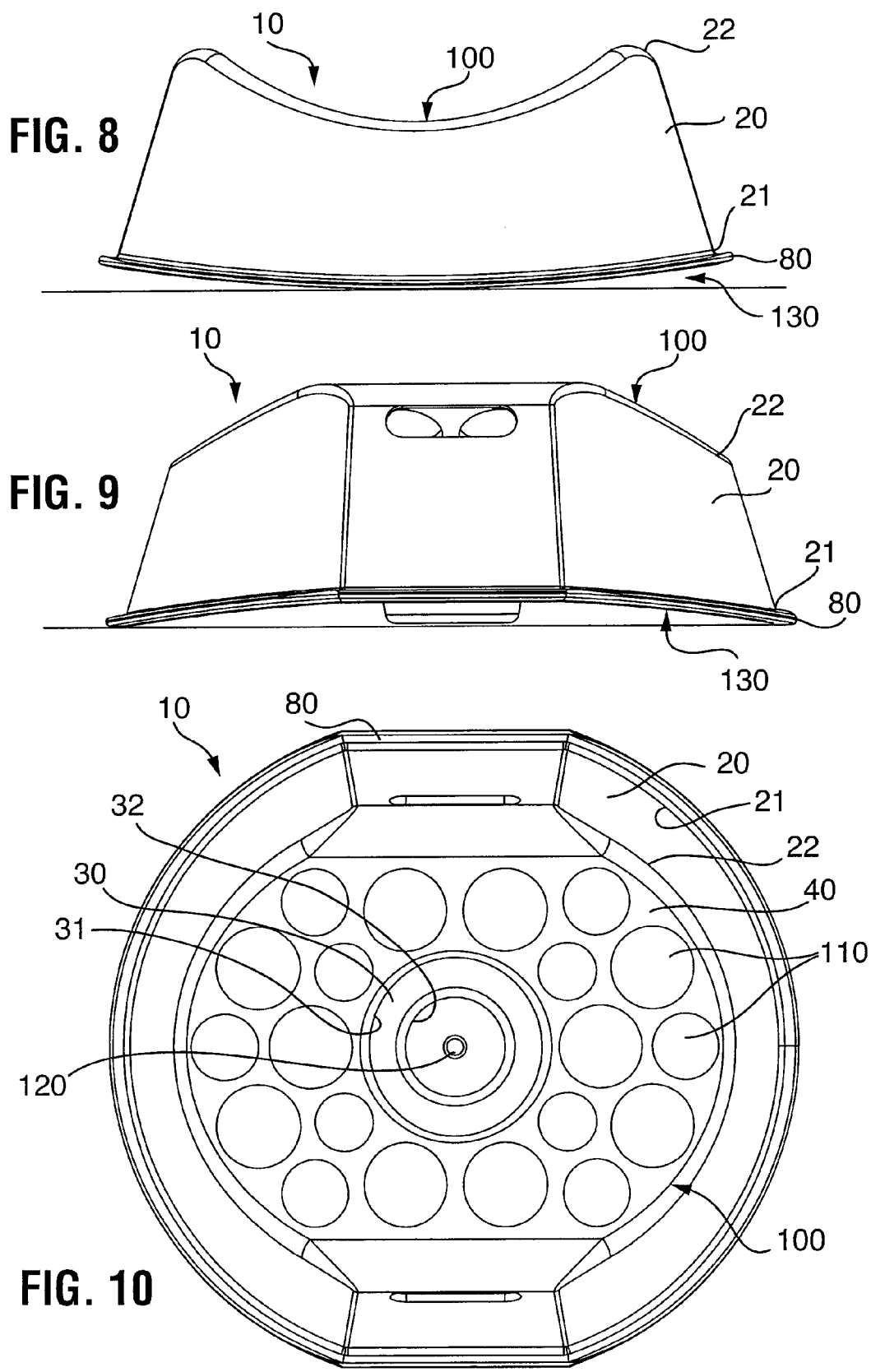

PIPE STAND

CROSS-REFERENCE TO RELATED APPLICATIONS

This application is the U.S. national stage application of International Application No. PCT/CA2011/050456, filed Jul. 26, 2011, which International application was published on Feb. 2, 2012 as International Publication No. WO 2012/012898 A1 in the English language, and which application is incorporated herein by reference. The International application claims priority of U.S. Provisional Patent Application No. 61/368,104, filed Jul. 27, 2010, which application is incorporated herein by reference.

FIELD OF THE INVENTION

The invention relates generally to the field of pipeline installation and in particular to methods and products for supporting a pipeline during assembly and installation both out of the trench and in the trench.

BACKGROUND OF THE INVENTION

The basic process of installing buried pipelines generally includes the steps of digging a long trench for the pipeline, laying out sections of pipe end to end and adjacent to the trench line, joining the sections of pipe into a continuous pipeline, placing the pipeline into the trench, backfilling the trench, and hydro-testing the pipeline, prior to putting the pipeline into service.

The pipeline must be held off the ground during the pipeline assembly process, the joining together of the individual sections of pipe, and upon installation of the pipeline in the trench.

During the pipeline joining process, the sections of pipe are generally supported off the ground to prevent pipe and coating damage as well as to provide full and easy access to each pipe joint for joining.

The most prevalent method of supporting pipes outside the trench prior to joining is the use of large wooden skids, which are positioned in an alternating, interlocking box pattern that can be scaled to whatever height is required. This method may be rather costly, since the skids which are relatively heavy, must be manually placed prior to lowering of the pipe sections and later manually removed and loaded onto trucks following the placement of the pipeline into the trench. Mechanical removal methods are also available but can be costly as well.

U.S. Pat. No. 7,278,613 to Roy is directed to a pipeline skid and a skid system for use in pipeline construction.

Support cones made of polymeric material are also sometimes used for supporting pipe sections out of trench, but typically only for small diameter pipes of less than 24 inches diameter (600 mm diameter or less). These cones have a pipe size and weight limitation and are meant for a single height and are not used in the trench. These cones are not usable for supporting the pipeline in the trench, since they are typically too tall and do not have sufficient load bearing capacity to support the pipeline during backfilling and continuity testing during which the pipeline is completely filled with water. Of course, the water used for hydrostatic testing adds a significant amount of weight to be supported, in fact a multiple of the weight of the pipeline itself. The cones are particularly prone to collapse when sideways forces are applied under load, because of twisting, bending, or sideways movement of the pipeline during the installation process.

Installations of buried pipelines in areas where rocks or stones are present often require some form of protection to prevent damage to the coating of the pipes, or the pipe itself. For proper pipeline installation, the pipeline must be held off the bottom of the trench to allow for the free flow of backfill material in the trench and around the pipeline. Current methods for holding the pipe up off the trench bottom are expensive and can cause pipeline damage.

In trench pipeline support is currently achieved in various ways. The in trench supporting methods used are intended to not only prevent damage to the pipe but also to prevent interference with the pipe corrosion protection methods used. Generally, pipeline corrosion is prevented by injecting a low voltage protection current of one volt into the soil, which current is transmitted to the pipe and prevents corrosion at locations where the pipe coating may have been damaged, thereby exposing the metal of the pipe to the soil. Electrical contact between the pipe and the soil is generally made through water in the soil.

US 2003/0218103 is directed to a pipeline support for in trench pipeline support.

One in trench support method includes the placement of piles of sand in the trench to hold the pipeline off the trench bottom until backfilling. Although this can be a suitable method for light, small diameter pipelines (up to 323.9 mm diameter), it is often unsuitable for larger diameter pipelines, since the uneven support provided by a sand pile may cause the pipe to deform and become oval which is an unacceptable and expensive problem to remedy. Moreover, the installation of sand piles is very difficult in installations wherein the pipeline is joined above the trench, since it is hard to reach over the pipe to properly place the sand piles in the trench.

Another in trench supporting method employs sandbags, which are installed in the trench to hold the pipeline off the trench bottom. If not properly placed, sandbag supports can create a hard spot where the pipeline is likely to dent or oval, which is an unacceptable and expensive problem to remedy, as mentioned above. More importantly, the sheer number of sandbags required with this method, all of which have to be manually placed, makes it very difficult to ensure proper care is maintained in the sandbag placement. Finally, since sandbags must be positioned manually, safety is a concern with personnel in the pipeline trench for extended periods, since trench depth often exceeds 4 feet (1.2 m) and trenches may be subject to ground water intrusion.

Foam can be sprayed into the trench to hold the pipeline off the trench bottom until back filling. This pipeline supporting method may raise concerns over the environmental impact of the foaming chemical. Moreover, cost of the foam materials is relatively high, the foam requires significant time to harden to the point where it can support the weight of the pipeline and there is a definite potential for the cured strength of the foam being insufficient for supporting the pipeline during continuity testing. Finally, the availability of and access to foaming equipment is an issue, particularly in remote areas and in rugged terrain. Of course, the foam material also has the potential to shield the pipeline's cathodic protection system.

The use of foam pillows placed into the pipeline trench to hold the pipeline off the trench bottom until back filling is also known. The foam pillows used are generally pre-fabricated and are typically covered in plastic to somewhat address the potential concerns over the environmental impact of the foam material. However, as with the sandbag method, the placement of the foam pillows often requires personnel in the trench. In addition, foam pillows are lightweight and can either be blown or floated out of position prior to the pipeline being installed (ground water is often present in areas of stony or rocky terrain). Another significant concern with using foam pillows is the high likelihood of cathodic shielding. As mentioned above, the electrical system of protecting the pipeline steel from rusting by injecting a low voltage current into the ground is impeded by the foam and/or plastic covering and the material of the foam pillows themselves.

Consequently a method and apparatus for supporting a pipeline or pipe sections prior to installation (out of trench) and/or once installed (in the trench) is required which overcomes at least one of the problems encountered with current pipeline supporting methods and apparatus.

SUMMARY OF THE INVENTION

A preferred pipeline support in accordance with the invention includes a hollow body for supporting a length of pipe, which body includes an outer supporting wall, an inner supporting wall spaced inwardly from the outer supporting wall, and a connecting portion for maintaining the inner and outer walls in a fixed, spaced apart relationship. The inner and outer supporting walls both have a lower end for engagement with the ground and an upper end for supporting the length of pipe.

In one aspect, the invention provides a pipe support having a tubular outer support wall, a tubular inner support wall having a generally frustoconical shape, spaced inwardly from the outer support wall, and a connecting portion for maintaining the outer support wall and the inner support wall in a fixed, spaced apart relationship.

In an embodiment of the invention, the outer support wall also forms a generally frustoconical shape, the outer support wall being tapered upwardly and the inner support wall being tapered downwardly.

In an embodiment of the invention, the inner support wall, the outer support wall and the connecting portion combine to form a pipe saddle for supporting the pipe.

In an embodiment of the invention, at least one of the inner and outer support wall comprises a plurality of shaped wall sections with intermediate spacing webs.

In an embodiment of the invention, each of the inner and outer support wall comprises a plurality of shaped wall sections with intermediate inner and outer spacing webs respectively, and the connecting portion includes a plurality of connecting sections extending radially between the inner and outer shaped wall sections and the inner and outer spacing webs. In this embodiment, the pipe saddle is formed by the connecting sections extending radially between the inner and outer shaped wall sections and the connecting sections extending radially between the inner and outer spacing webs maintain the inner and outer support walls at a fixed spacing.

In an embodiment of the invention, the shaped wall sections have a trapezoidal or triangular shape.

In an embodiment of the invention, the outer shaped wall sections are upwardly tapered.

In an embodiment of the invention, an outer shaped wall section, a radially opposed inner shaped wall section and a section of the connecting portion extending therebetween form a support pillar.

In an embodiment of the invention, the pipe saddle is supported by three or more of the support pillars.

In an embodiment of the invention, the inner support wall, the outer support wall, or both, have a support flange proximate the bottom end of the support wall for engagement with the ground.

In an embodiment of the invention, the bottom end of the inner support wall has an inner support flange and the bottom end of the outer support wall has an outer support flange, the inner support flange being spaced vertically upward from the outer support flange to provide a vertical gap between the bottom of the outer support flange and the bottom of the inner support flange, when the pipe support is in a no load state.

In a further aspect, the present invention provides a pipe support having a tubular outer support wall having a generally frustoconical shape, a tubular inner support wall, spaced inwardly from the outer support wall, and a connecting portion for maintaining the outer support wall and the inner support wall in a fixed, spaced apart relationship.

In an embodiment of the invention, the plurality of shaped wall sections have a recess and a support stop, for receiving and supporting another pipe support stacked vertically above the pipe support.

The body can have a top surface connecting the upper end of the inner and outer supporting wall, which top surface is preferably shaped to conform to the outer shape of the length of pipe to be supported, forming a pipe saddle. In one embodiment the connecting portion is at or near the top surface. However, the connecting portion may be at a lower position so that it does not form the top surface and the pipe is instead supported on the upper end of the inner and outer supporting walls, allowing for added strength and interlocking design.

The inner supporting wall defines an opening in the body of the pipe support which extends from the upper end to the bottom end of the inner supporting wall to provide a passage from the length of pipe to the ground, when the length of pipe is supported on the ground by the pipe support. In an embodiment of the invention, the opening is substantially central for an even load bearing capacity.

The top surface preferably includes one or more recesses to provide a passage beneath a supported length of pipe from the opening to an exterior of the body to provide a path to allow a cathodic protection flow to the surface of the supported pipe.

A height of the inner supporting wall is preferably lower than a height of the outer supporting wall. The inner and outer supporting walls are preferably annular, most preferably of frustoconical shape. One or more supporting ribs can be provided in the inner and/or outer surfaces of the inner or outer supporting walls for increasing a lateral stability of the inner or outer supporting walls as well as increasing their load bearing capacity.

The top surface is preferably provided with at least one opening connecting the top surface with the hollow interior of the body in order to allow trapped air from escaping from within the hollow body. A ground supporting flange is provided on the bottom end of at least one of the inner and outer supporting walls. The top surface of the body is preferably generally concave and divided into a plurality of pipe supporting areas which are evenly spaced and separated by intermediate step down sections which provide stacking shoulders for supporting the bottom end of the outer supporting wall of another like pipe support. The stacking shoulders allow for the stacking of two or more layers of pipe supports in an interlocking relationship. In an embodiment of the invention there are 4 to 10 pipe supporting areas. In an embodiment of the invention, 6 pipe supporting areas allow for one particularly stable stacking configuration.

Each wall can be divided into individual tapered and weight bearing wall portions and respectively interconnecting, non-weight bearing wall portions. The outer wall portions are preferably upwardly tapered and the inner wall portions downwardly tapered. The upper end of each wall portion is preferably constructed for engagement with the length of pipe to be supported. The height of each wall portion is preferably adjusted to the diameter of the pipe to be supported so that the length of pipe can be supported across the top of the pipe support in such a way that a central axis of the pipe is supported vertically above a center of the pipe support.

To allow for a slight deformation of the pipe support in order to insure a best fit of the pipe support to the shape of the supported length of pipe, the body is preferably constructed such that when the pipe support is supported on the ground without a supported pipe, the inner supporting wall is upwardly spaced from the ground. The inner supporting wall is preferably upwardly spaced from the ground by at least 0.5 inch (12.7) mm.

The pipe support is preferably shaped to be stackable in one or more layers, as described above. The pipe support is also preferably shaped to be nestable with other like pipe supports in order to reduce the space requirements for transport. In order to avoid jamming of one pipe support into another in the nested condition, the outer supporting wall is preferably provided with exterior spacer tabs, which maintain nested pipe supports in a slightly spaced apart, yet nested condition. Interior spacer tabs may also be provided on the inner supporting wall for more reliable jamming prevention and to allow the use of nested pipe supports in supporting the length of pipe.

Contacting surfaces of the pipe support, which means those surfaces which during use of the pipe support come in contact with the pipe to be supported are preferably textured in order to increase access of moisture to the pipe in the installed condition and to decrease any danger of electric insulation of the pipe surface from the cathodic pipe protection current in the installed condition. In an embodiment of the invention, the texture is provided by a plurality of nubs formed with and extending from the respective surface or surfaces.

In a further aspect, the present invention provides a pipe support having an outer perimeter of tubular outer supports, an inner perimeter of tubular inner supports, spaced inwardly from the outer supports, and a connecting portion for maintaining the outer supports and the inner supports in a fixed, spaced apart relationship.

In an embodiment of the invention, the inner supports have a generally frustoconical shape.

In an embodiment of the invention, the outer supports have a generally frustoconical shape. Thus, the inner and outer supporting walls can be made of a plurality of frustoconical tubes which each form part of a pipe supporting wall of the pipe support.

BRIEF DESCRIPTION OF THE DRAWINGS

Embodiments of the present invention will now be described, by way of example only, with reference to the attached Figures, wherein:

FIG. 8 is an isometric side view of the pipe support of FIG. 6;

FIG. 9 is another isometric side view of the pipe support of FIG. 6;

FIG. 10 is a bottom plan view of the pipe support of FIG. 6;

DETAILED DESCRIPTION

Figure 1:
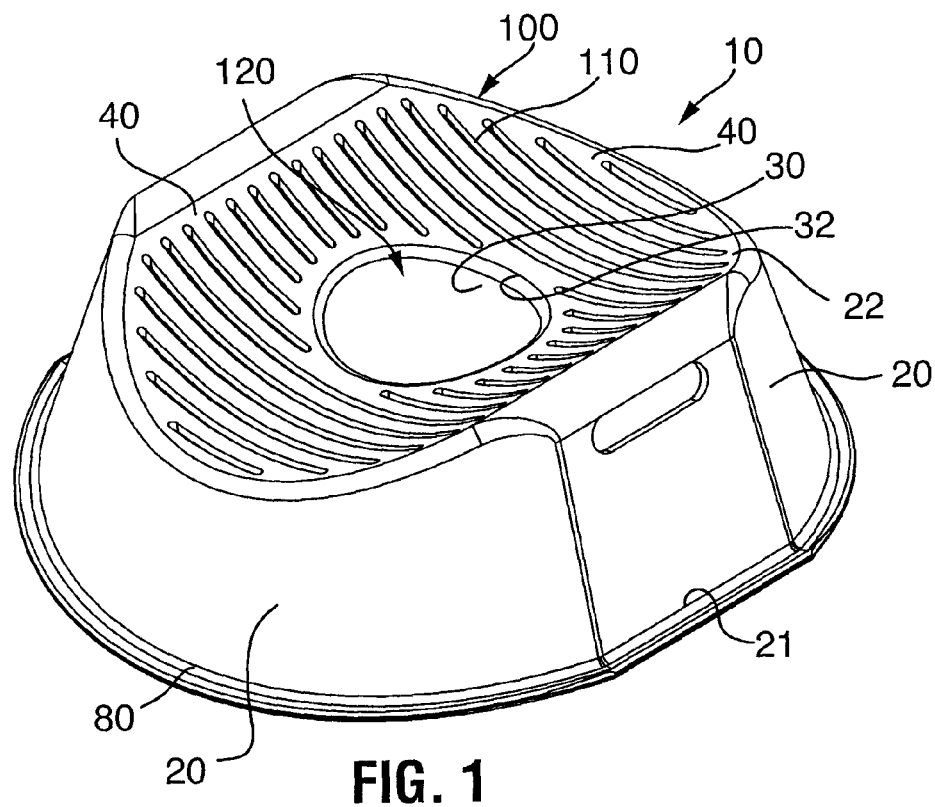
FIG. 1 is a perspective top view of a first embodiment of a pipe support of the present invention.
Figure 2:
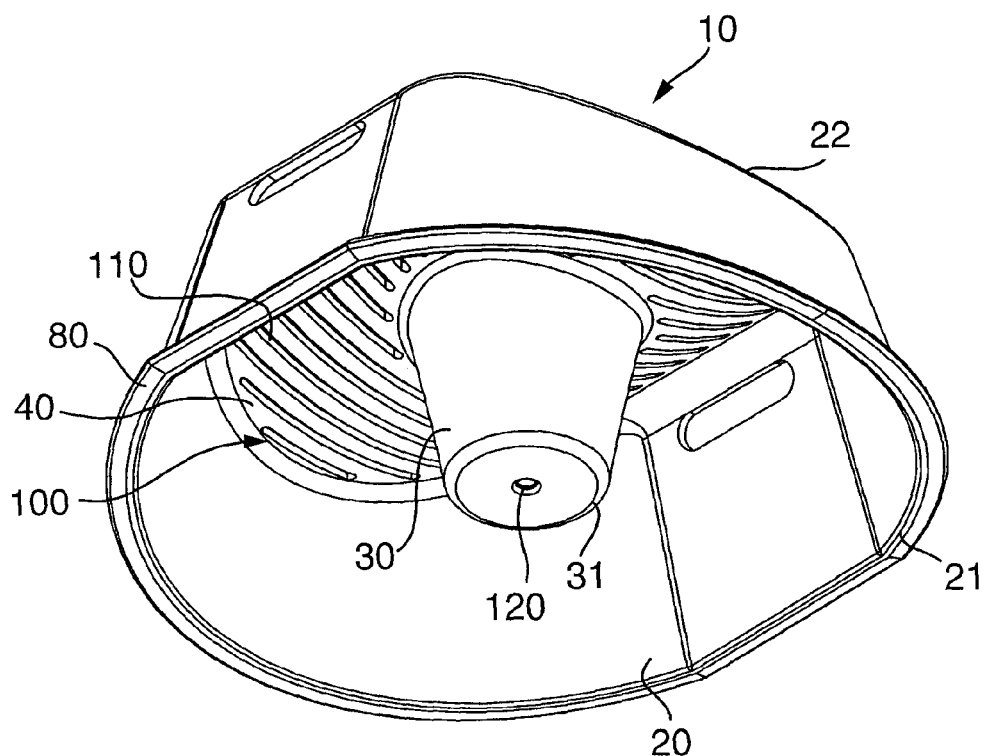
FIG. 2 is a perspective bottom view of the pipe support of FIG. 1.
Figure 3:
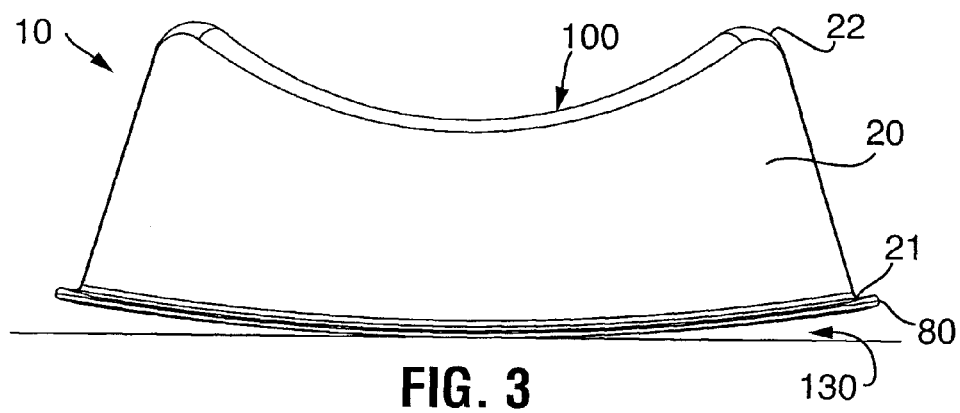
FIG. 3 is an isometric side view of the pipe support of FIG. 1.
Figure 4:
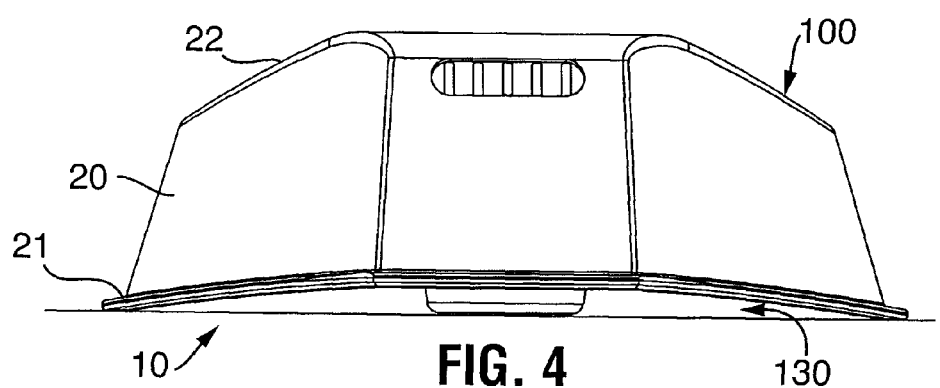
FIG. 4 is another isometric side view of the pipe support of FIG. 1.
Figure 5:
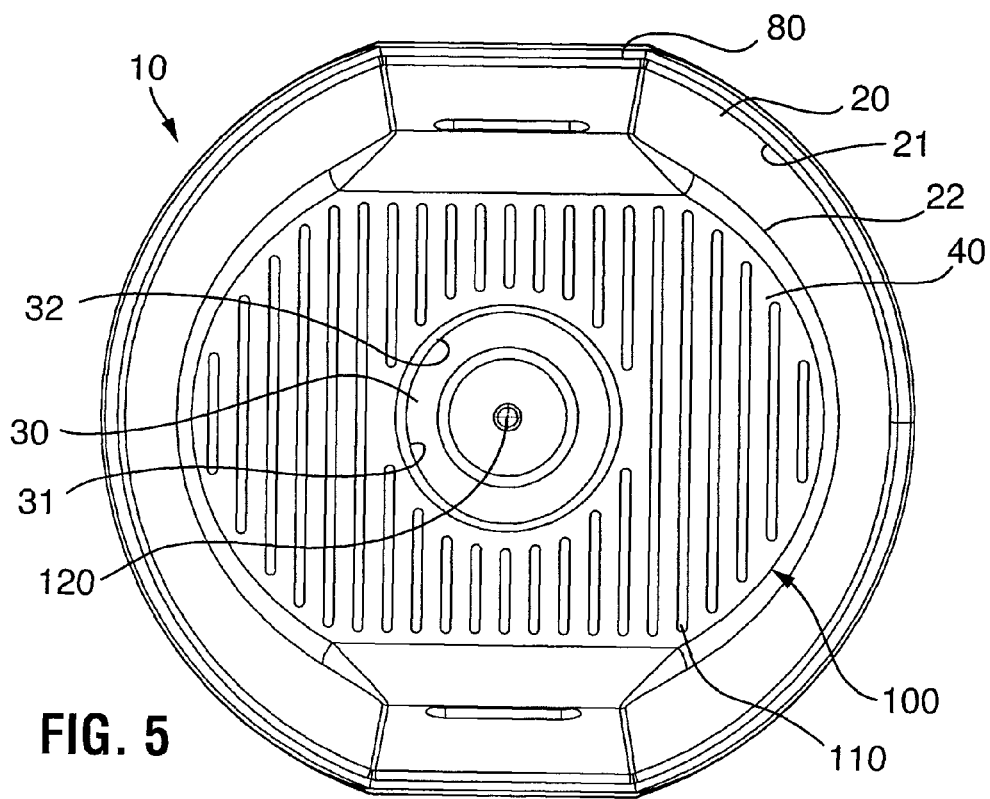
FIG. 5 is a bottom plan view of the pipe support of FIG. 1.
Figure 6:
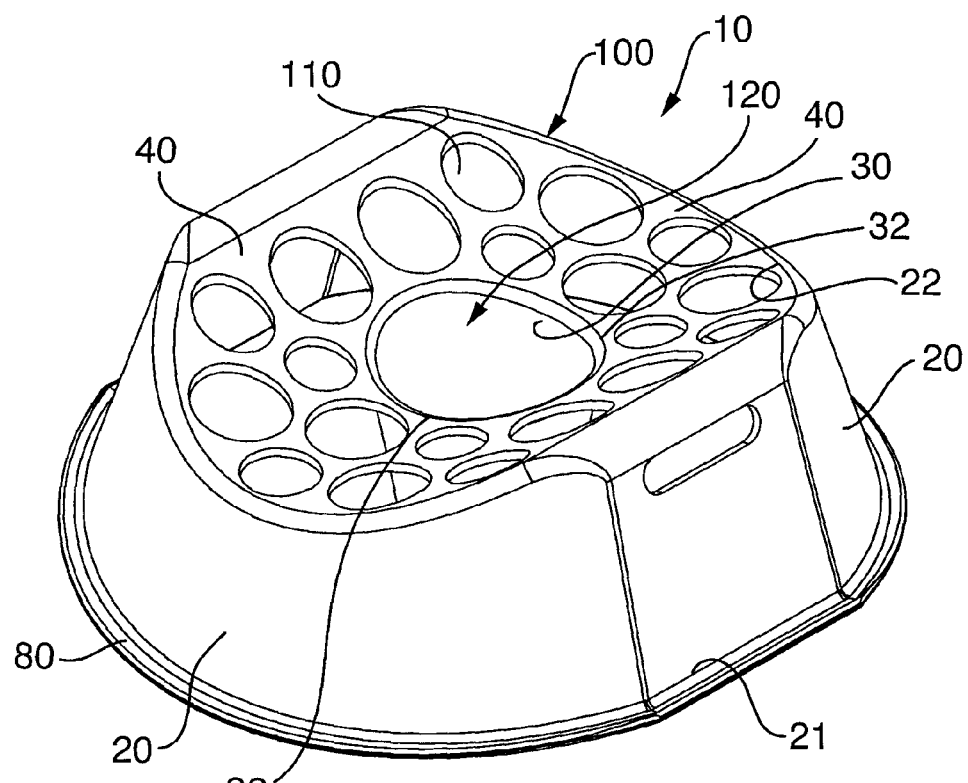
FIG. 6 is a perspective top view of a second embodiment of a pipe support of the present invention.
Figure 7:
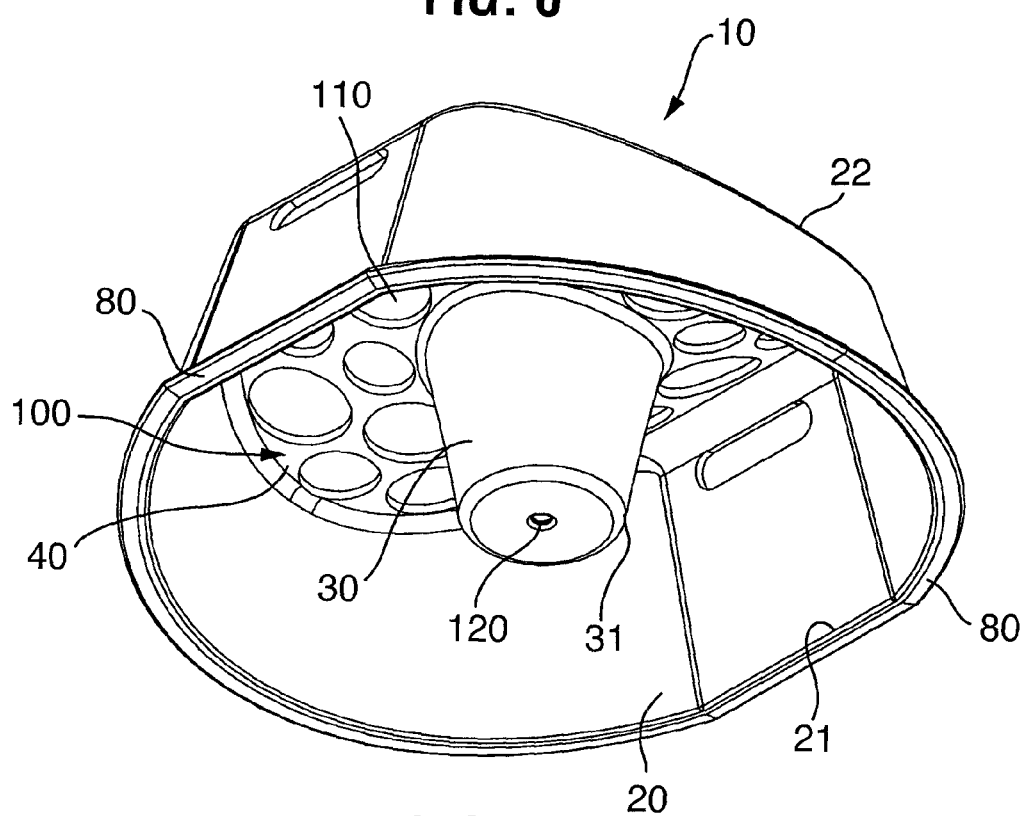
FIG. 7 is a perspective bottom view of the pipe support of FIG. 6.
Figure 11:
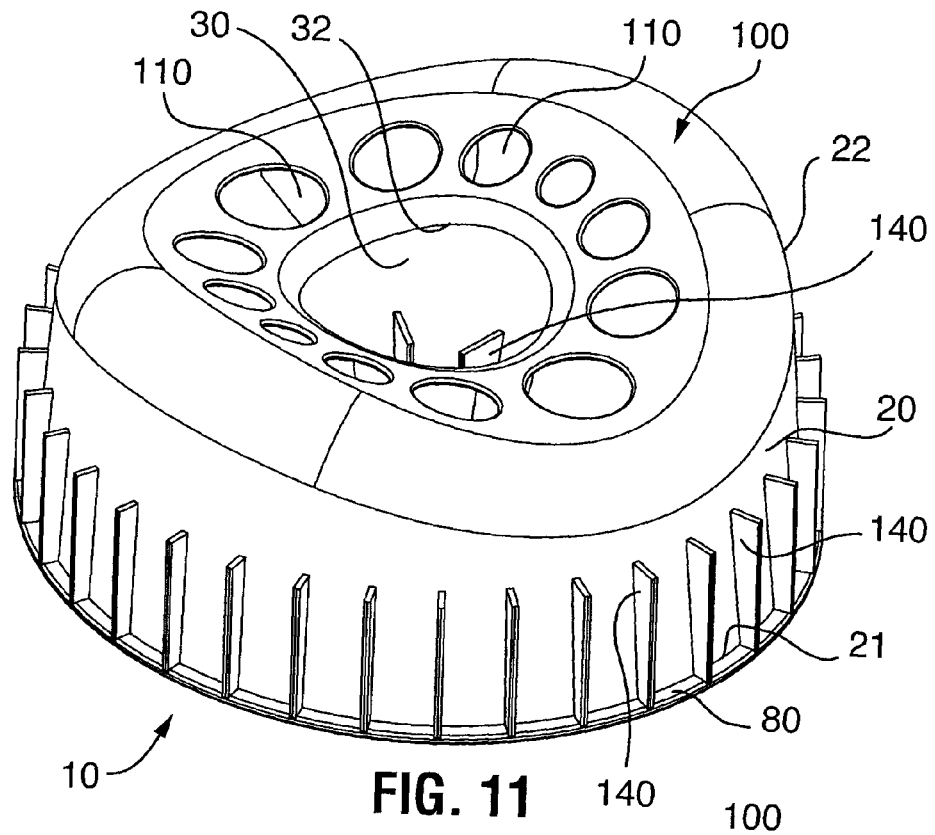
FIG. 11 is a perspective top view of a third embodiment of a pipe support of the present invention.
Figure 12:
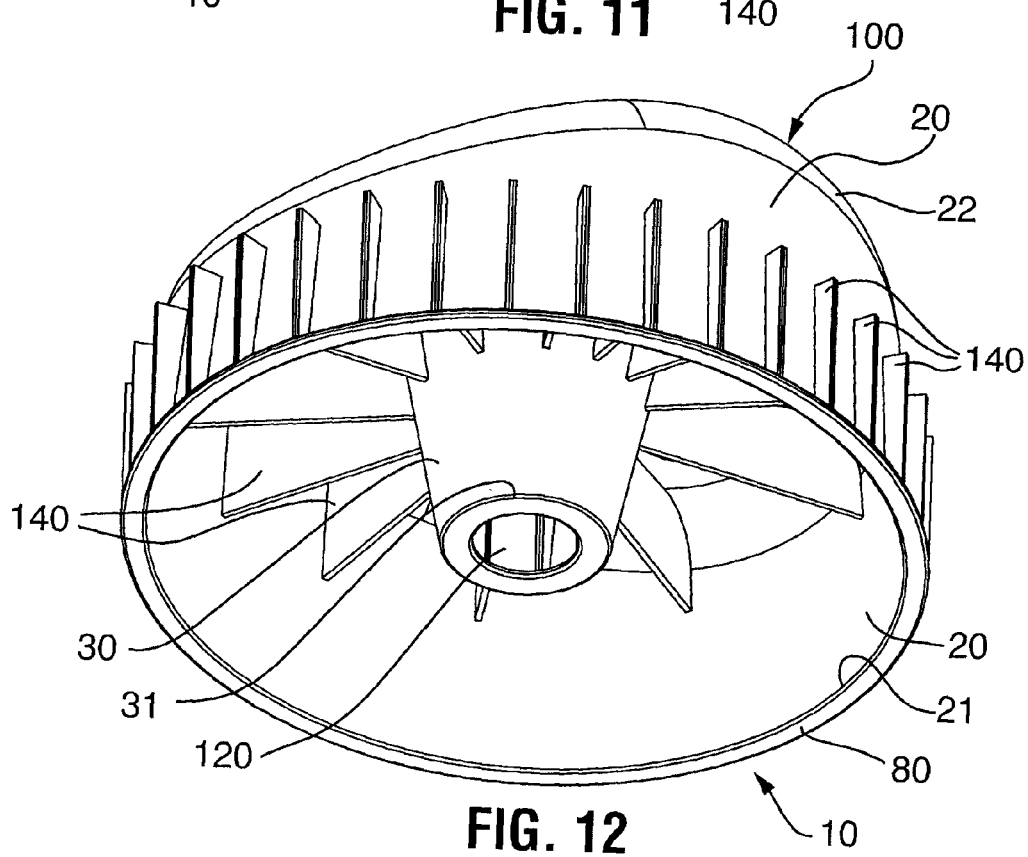
FIG. 12 is a perspective bottom view of the pipe support of FIG. 11.
Figure 13:
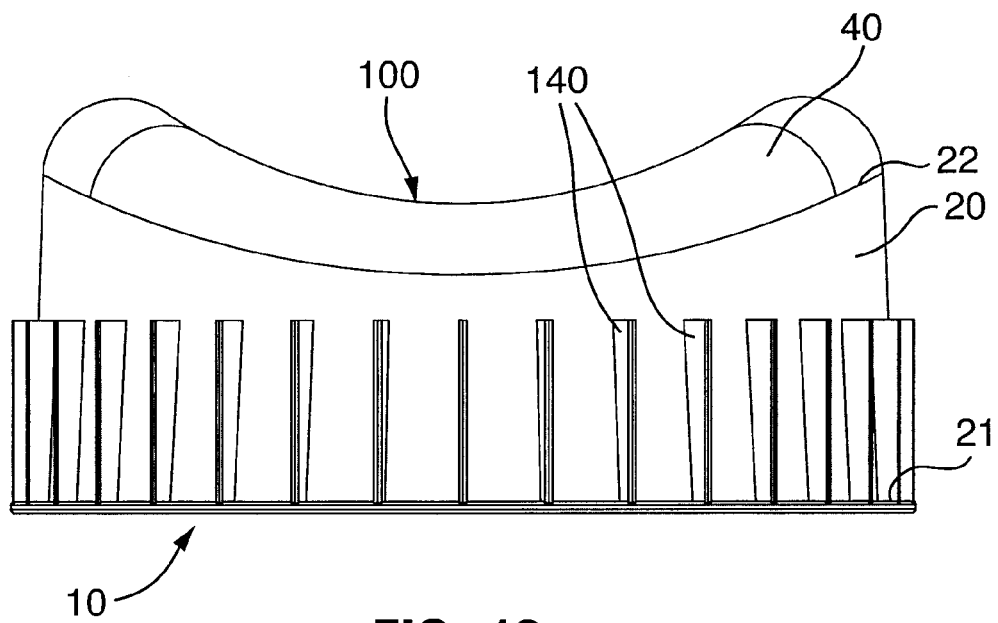
FIG. 13 is an isometric side view of the pipe support of FIG. 11.
Figure 14:
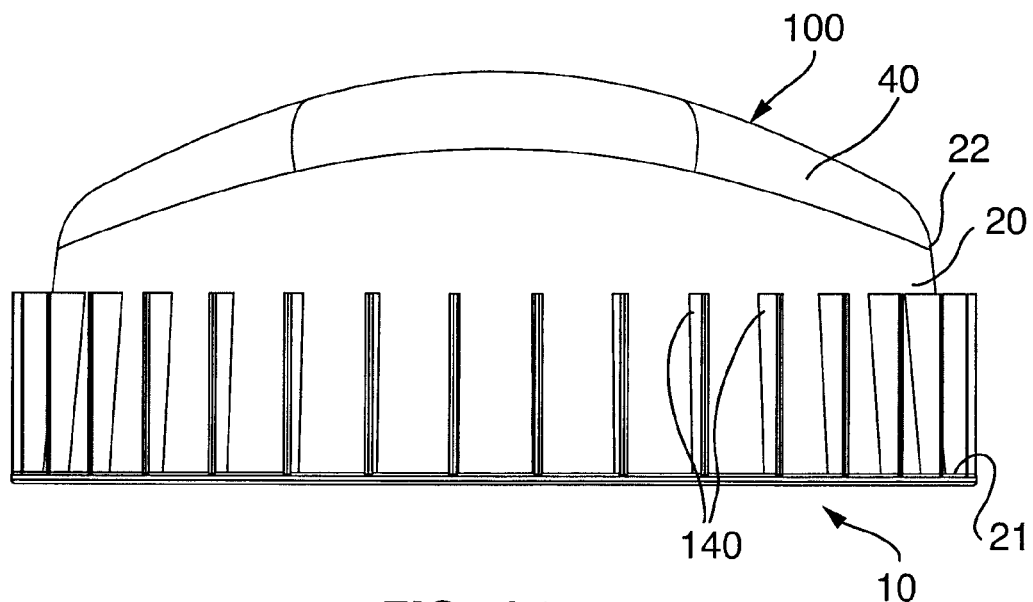
FIG. 14 is another isometric side view of the pipe support of FIG. 11.
Figure 15:
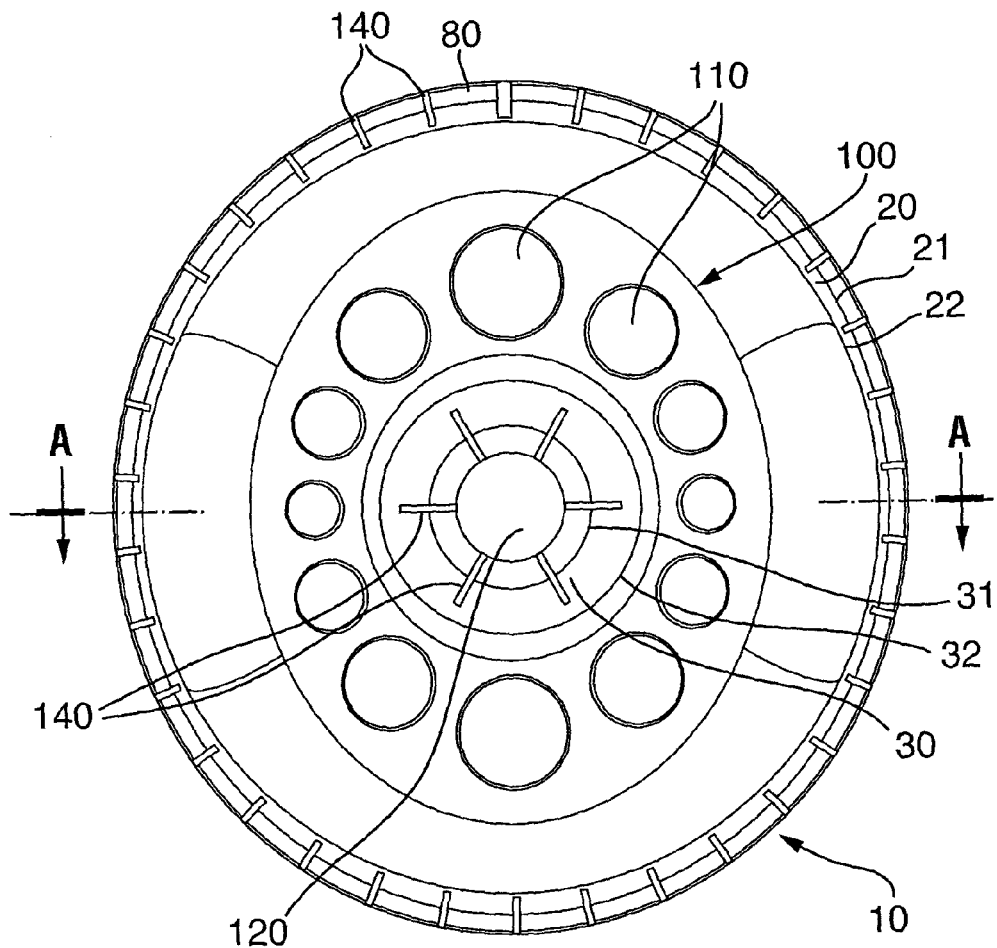
FIG. 15 is a bottom plan view of the pipe support of FIG. 11.
Figure 16:
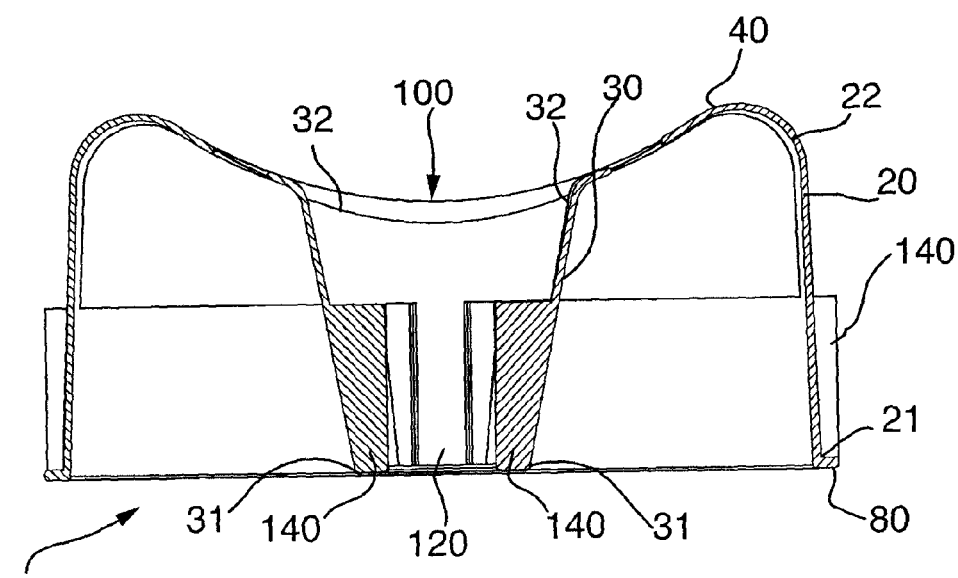
FIG. 16 is a cross-sectional view of the pipe support of FIG. 11, taken along line A-A in FIG. 15.
Figure 17:
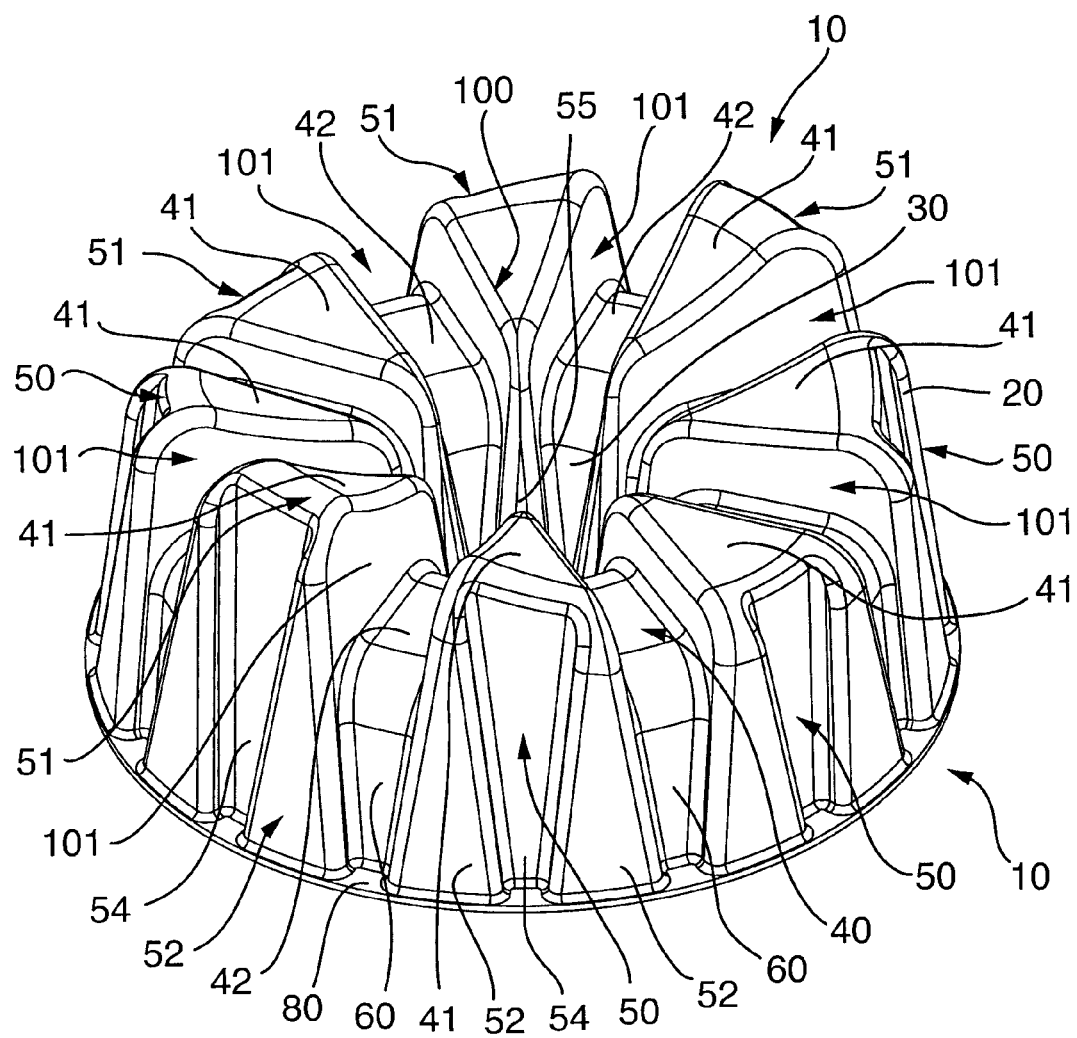
FIG. 17 is an isometric top view of a fourth embodiment of a pipe support of the present invention.
Figure 18:
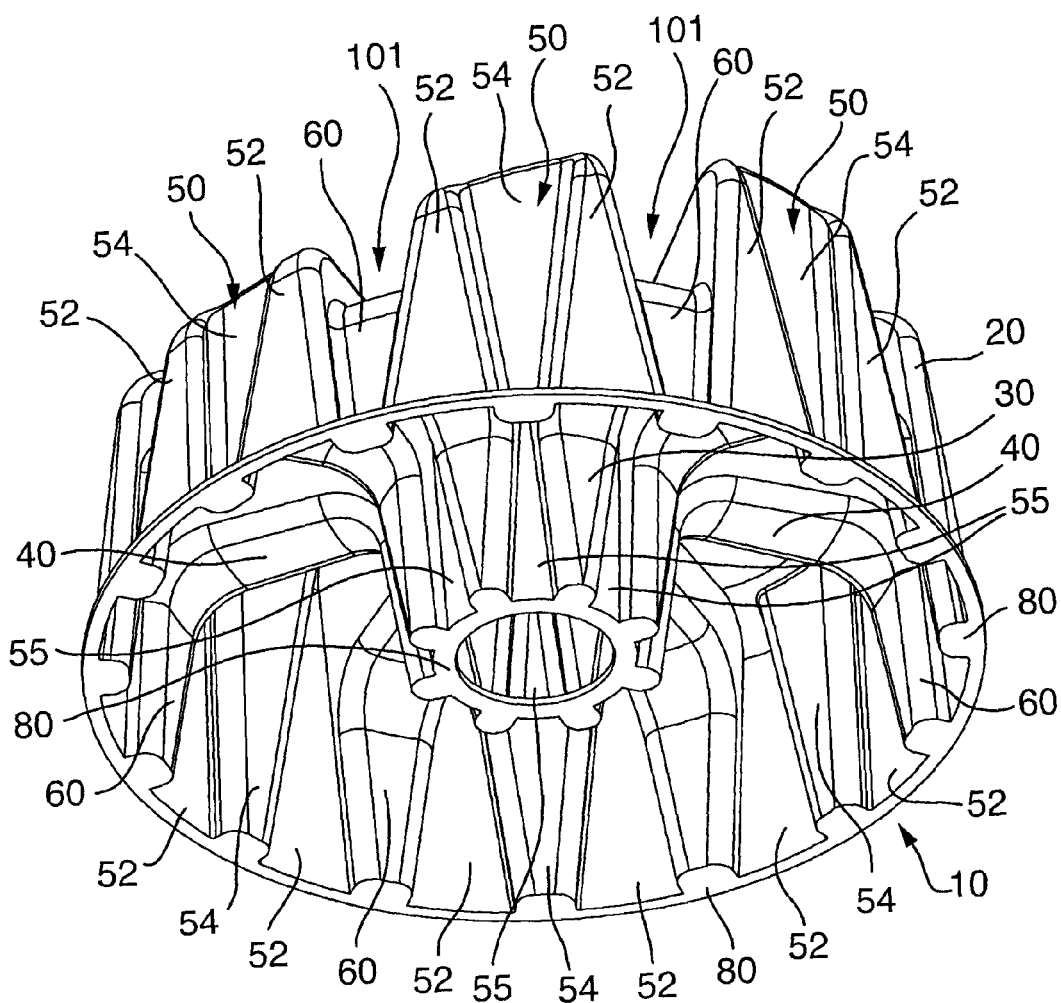
FIG. 18 is an isometric bottom view of the pipe support of FIG. 17.
Figure 19:
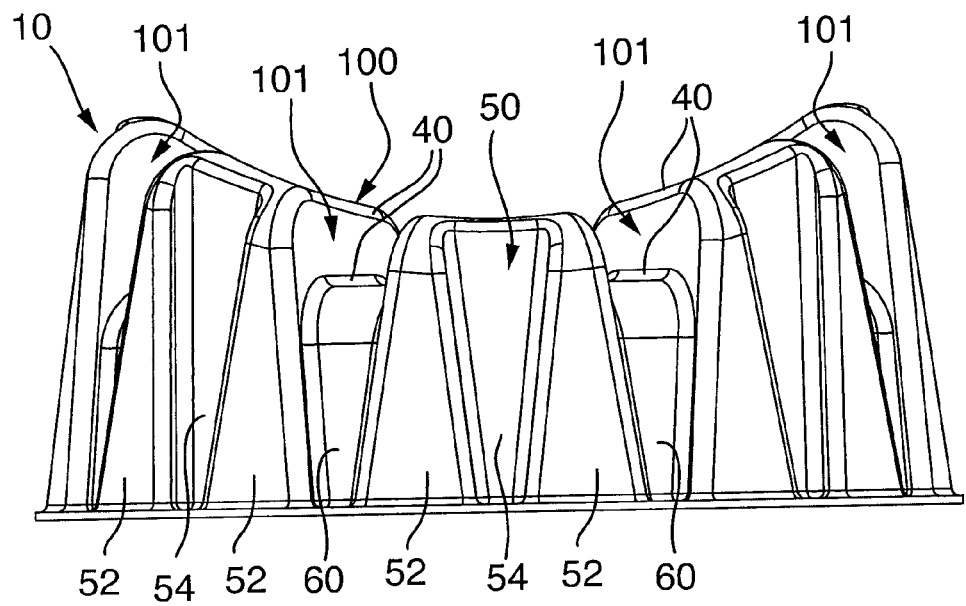
FIG. 19 is a side view of the pipe support of FIG. 17.
Figure 20:
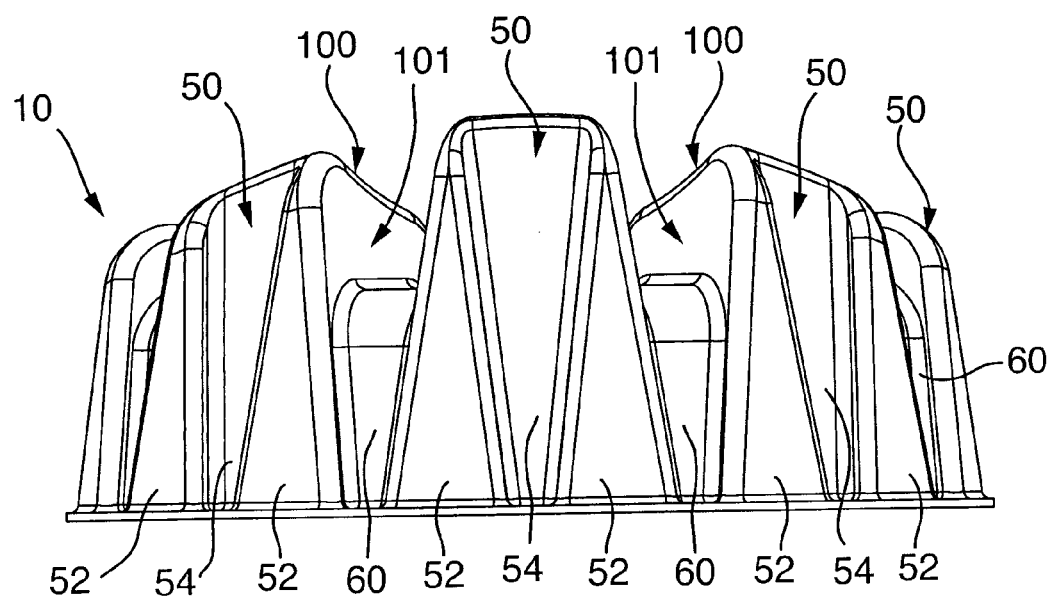
FIG. 20 is another side view of the pipe support of FIG. 17.
Figure 21:
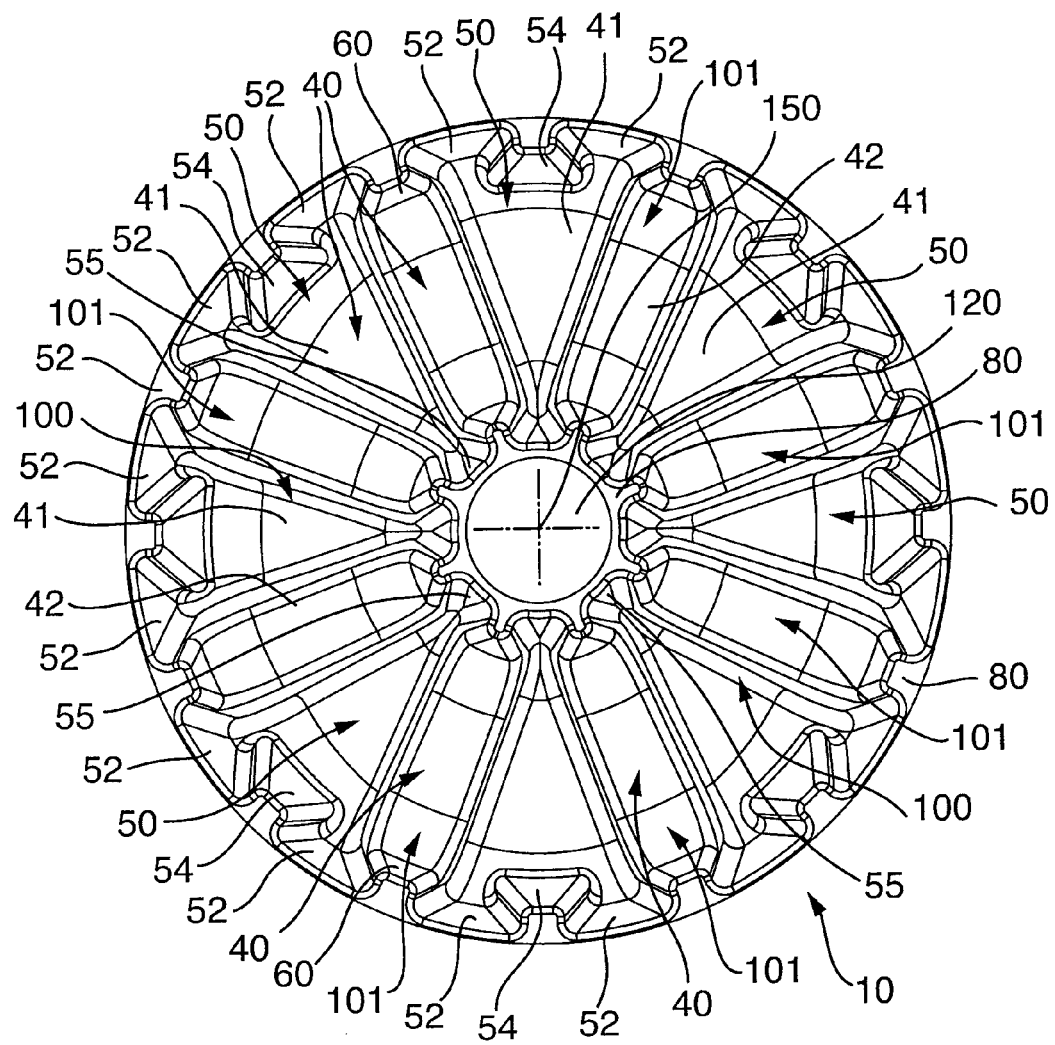
FIG. 21 is a top plan view of the pipe support of FIG. 17.
Figure 22:
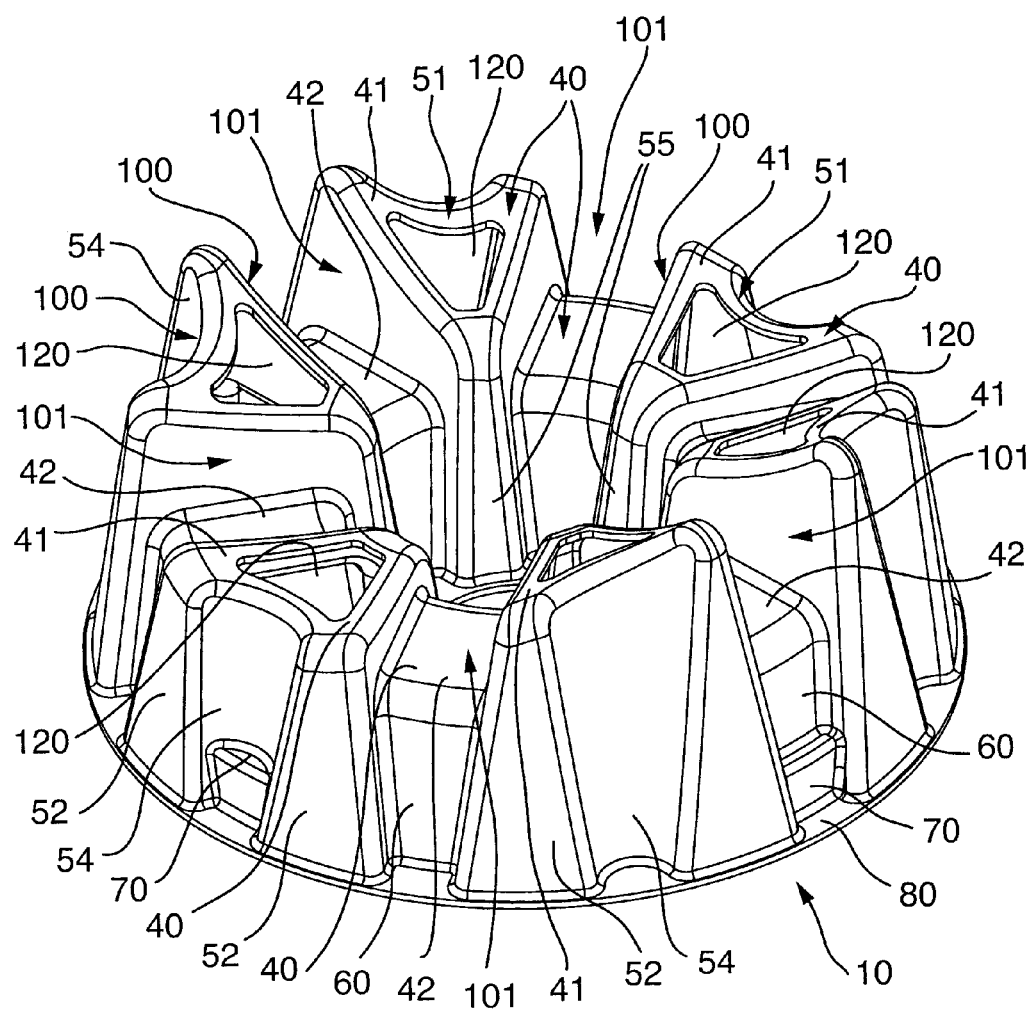
FIG. 22 is an isometric top view of a fifth embodiment of a pipe support of the present invention.
Figure 23:
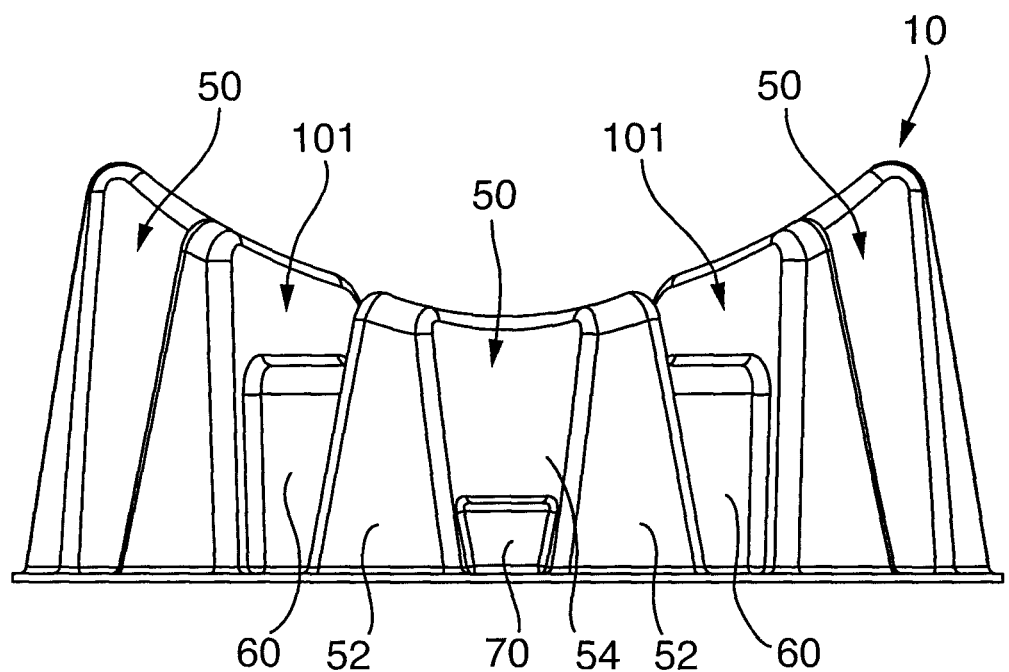
FIG. 23 is a front elevational view of the pipe support of FIG. 22.
Figure 24:
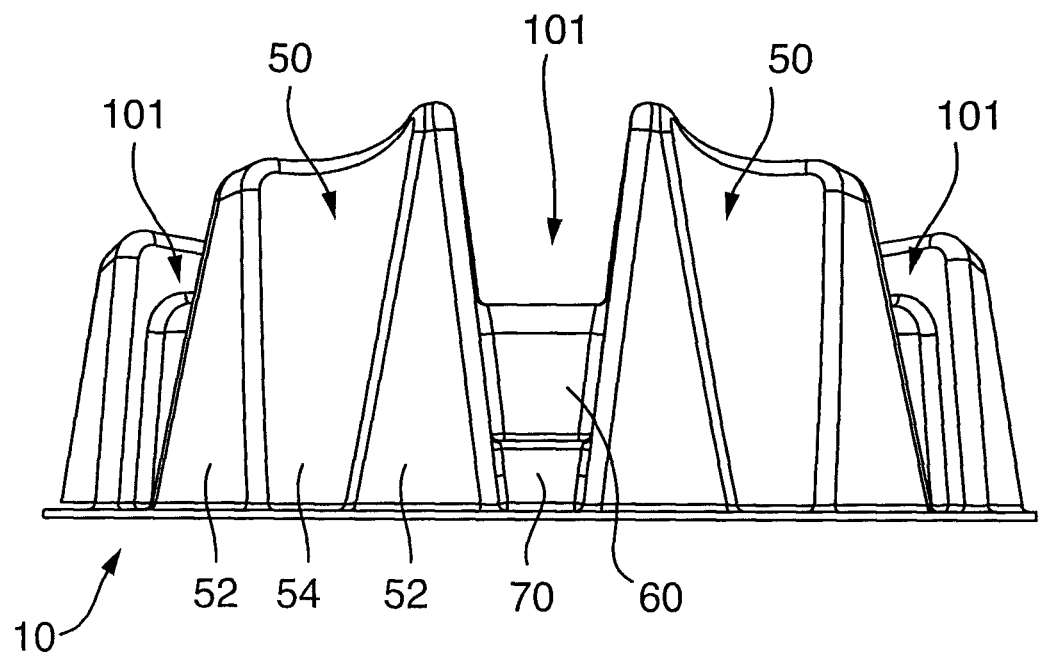
FIG. 24 is a side elevational view of the pipe support of FIG. 22.

Generally, the present invention provides a pipe support with a hollow body for supporting a length of pipe, which body includes a generally tubular outer supporting wall, a generally tubular inner supporting wall spaced inwardly from the outer supporting wall, and a connecting portion for maintaining the inner and outer walls in a fixed, spaced apart relationship. The inner and outer supporting walls both have a lower end for engagement with the ground and an upper end for supporting the length of pipe. The cross-section of the inner and outer supporting walls can have any geometric shape, but is preferably generally oval or circular. Quadrilateral (square or rectangular), or polygonal cross-sections are also possible. An elliptical cross-sectional shape provides a narrower profile along the pipeline axis to facilitate less ground congestion for out of trench use and better fit for in trench use.

In the first preferred embodiment illustrated in FIGS. 1-5, the pipe support 10 includes an outer, generally tubular support wall 20 having a ground engaging bottom end 21 and a pipe supporting top end 22; an inner support wall 30 spaced inwardly from the outer support wall 20 and having a generally frustoconical shape with a ground engaging bottom end 31 and a pipe supporting top end 32. A connecting portion 40 is provided for maintaining the outer support wall 20 and the inner support wall 30 in a fixed, spaced apart relationship.

Preferably, the outer support wall 20 has a generally frustoconical shape. More preferably, the inner support wall 30 has a generally downwardly tapered frustoconical shape and the outer support wall 20 has a generally upwardly tapered frustoconical shape. The top end 22 of the outer support wall 20 and the top end 32 of the inner support wall 30, together with the connecting portion 40 form a pipe saddle 100 for supporting the pipe. A base flange 80 is preferably provided at the bottom end of the outer support wall 20. The pipe support 10 may be fabricated such that one or more portions of the base flange 80 are spaced from the ground to provide a vertical gap 130 between the ground and the base flange 80 (see FIGS. 3 and 4) when the pipe support is in a no load state. The surface of the pipe saddle 100 (or any other portion of the pipe support in contact with the pipe) is preferably textured, preferably in the form of a plurality of small nubs (not shown) and/or openings in the form of slots 110 to facilitate the flow of a cathodic protection current.

The second and third embodiments shown in FIGS. 6-10 and 11-16 respectively, are of a similar construction as the first embodiment of FIGS. 1-5, except for the shape of the openings 110 in the second and third embodiments and the provision of reinforcing ribs 140 on the outer supporting wall 20 and on the inner supporting wall 30 in the third embodiment illustrated in FIGS. 11-16.

Figure 25:
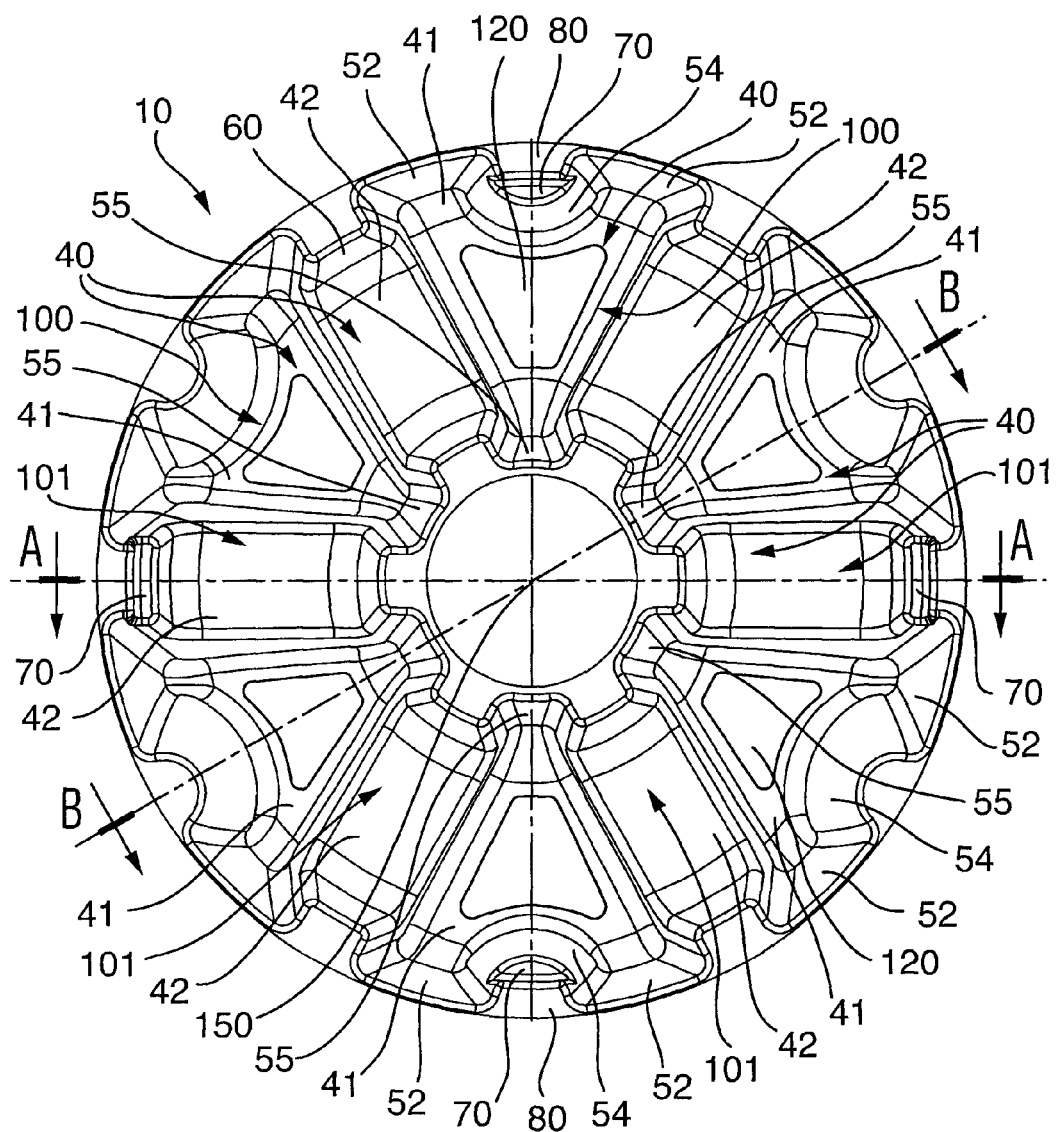
FIG. 25 is a top plan view of the pipe support of FIG. 22.
Figure 26:
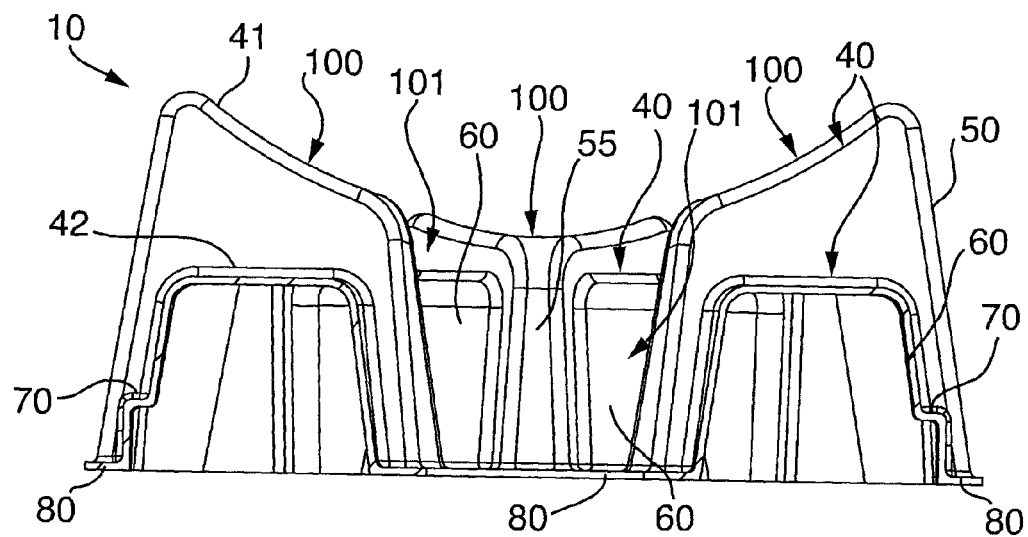
FIG. 26 is a cross-sectional view of the pipe support of FIG. 22, taken along line A-A in FIG. 25.
Figure 27:
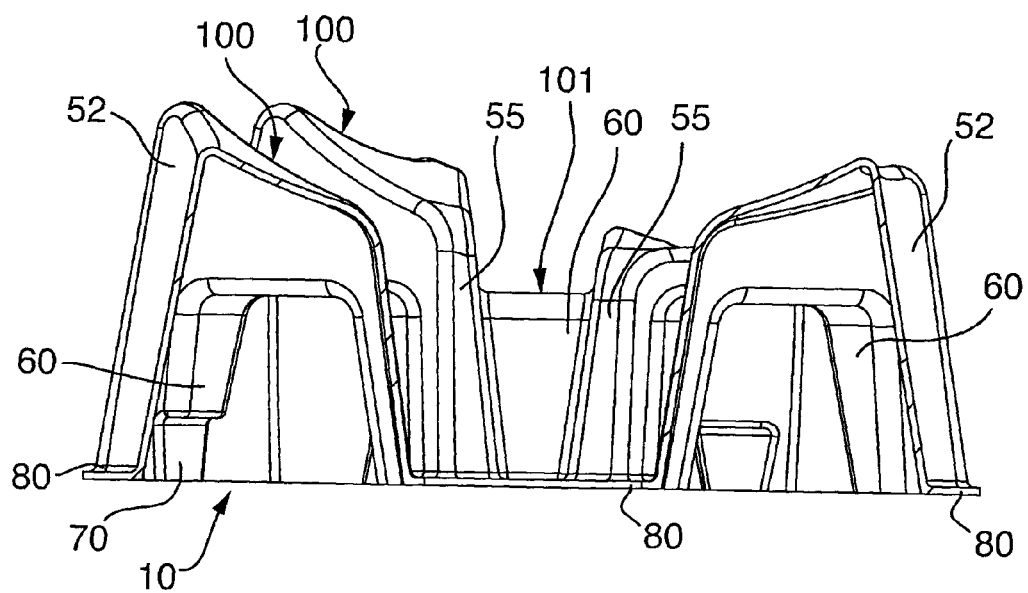
FIG. 27 is a cross-sectional view of the pipe support of FIG. 22, taken along line B-B in FIG. 25.
Figure 28:
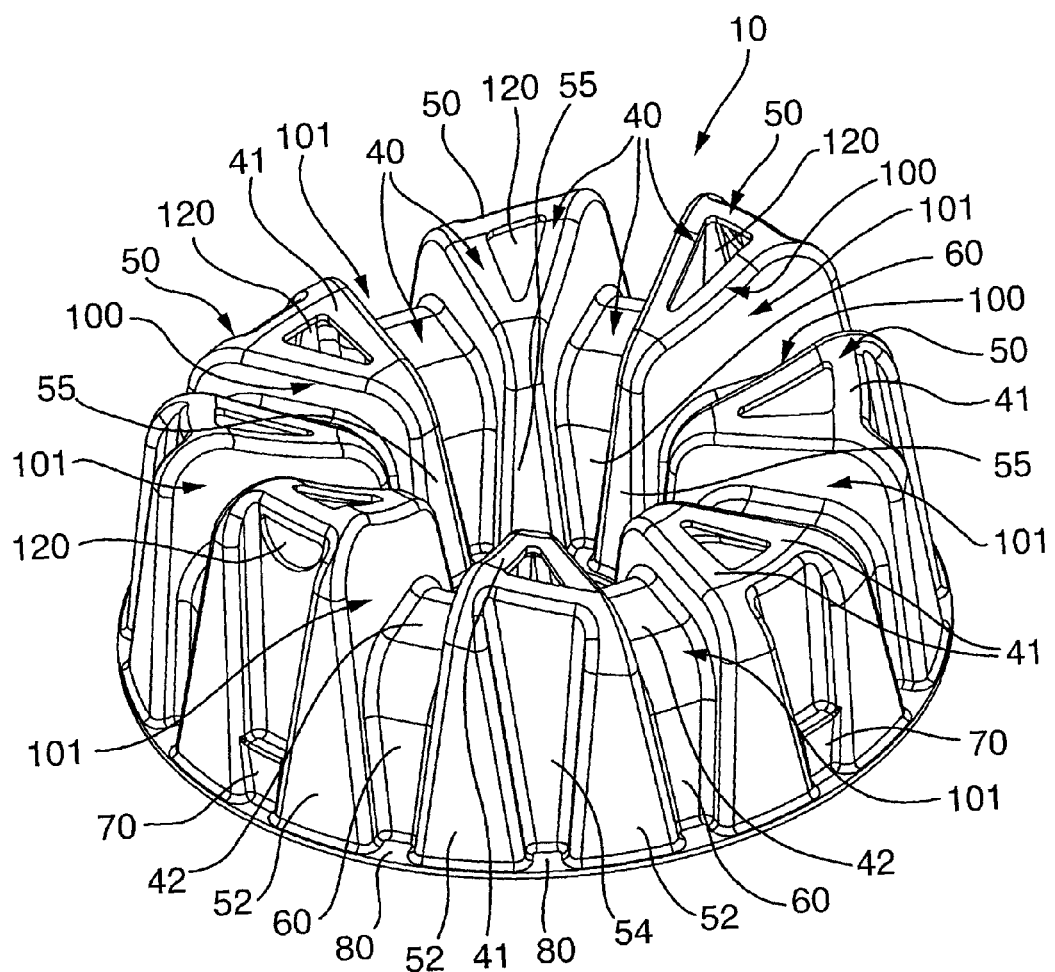
FIG. 28 is an isometric top view of a sixth embodiment of a pipe support of the present invention.
Figure 29:
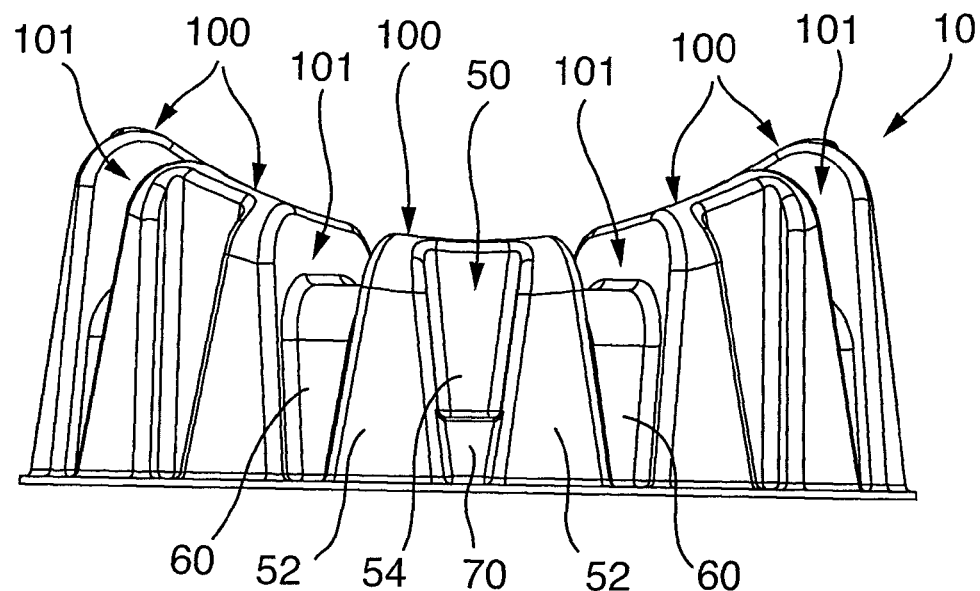
FIG. 29 is a front elevational view of the pipe support of FIG. 28.
Figure 30:
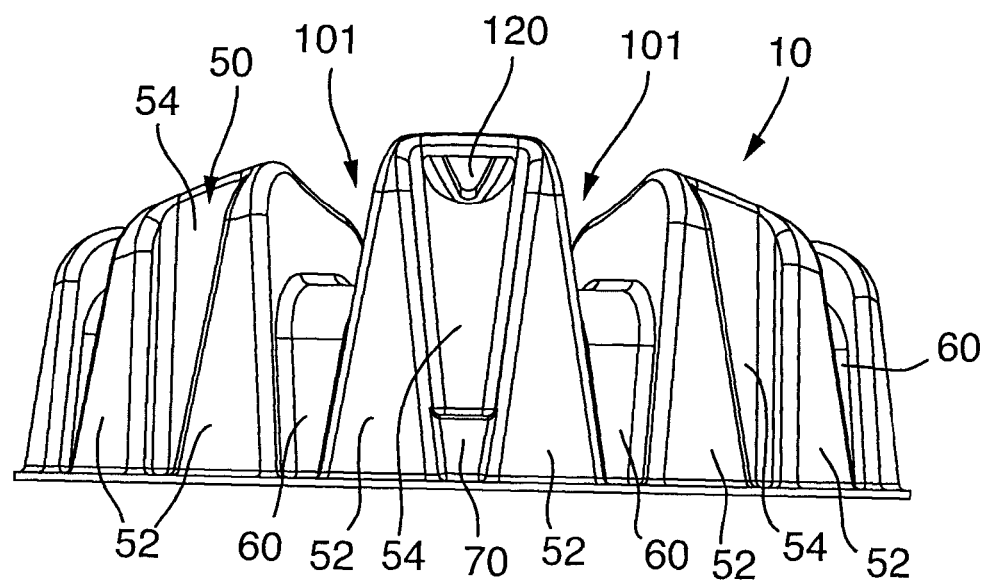
FIG. 30 is a side elevational view of the pipe support of FIG. 28.
Figure 31:
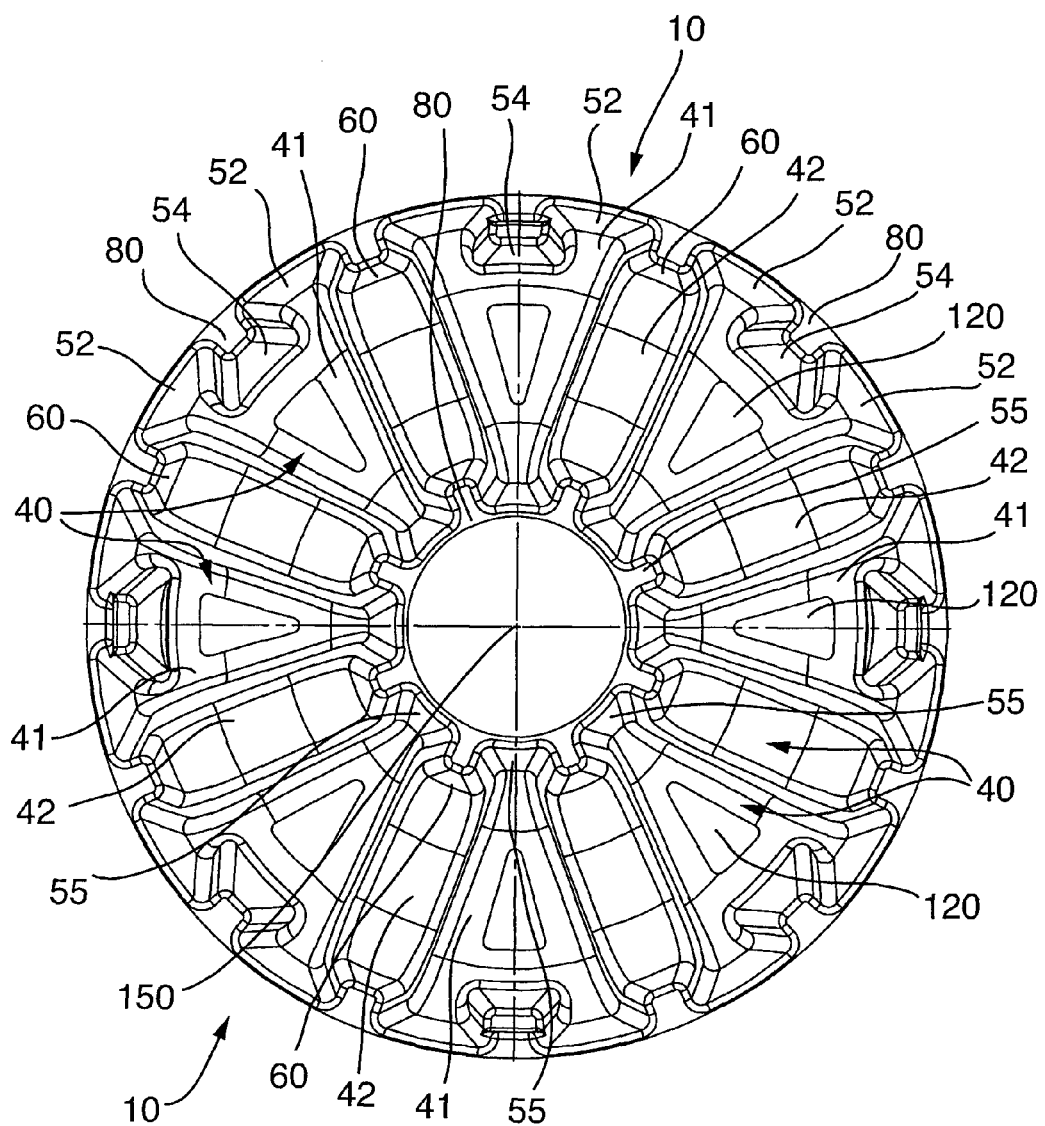
FIG. 31 is a top plan view of the pipe support of FIG. 28.

In the fourth embodiment of the pipe support of the invention, as shown in FIGS. 17-21, the pipe support 10 again includes a tubular outer support wall 20, and a tubular inner support wall 30 spaced inwardly from the outer support wall 20, and a connecting portion 40 for maintaining the outer support wall 20 and the inner support wall 30 in a fixed, spaced apart relationship. The inner and outer support walls 30, 20 are preferably coaxial with a common axis 150 (see FIGS. 21, 25, 31). In this embodiment and the following embodiments shown in FIGS. 22-33, the pipe saddle 100 is interrupted by several radially extending grooves or recesses 101 (see in particular FIG. 33), which allow for stacking of the pipe support 10, as will be discussed in more detail further below. As a result, at least one of the inner support wall 30 and the outer support wall 20 is divided into a plurality of spaced apart, outer shaped wall sections 50 and inner shaped wall sections 55 respectively, which wall sections 50, 55 are interconnected by intermediate spacing webs 60 defining the width of the recesses 101. The shaped wall sections 50, 55 preferably have a trapezoidal or triangular shape. More preferably, each of the outer shaped wall sections 50 is upwardly tapered and each of the inner shaped wall sections 55 is downwardly tapered.

Preferably, the inner support wall 30 and the outer support wall 20 are formed by a ring of shaped wall sections 50, 55 respectively, fixed in a spaced apart relationship by the intermediate spacing webs 60 between adjacent shaped wall sections 50, 55. The shaped wall sections 50, 55 are structurally designed to provide the strength to support a pipe (not shown), while maintaining a high load to weight ratio. The shaped wall sections 50, 55 may be shaped to provide both vertical support and lateral support, for example having a trapezoidal shape or triangular shape or a mixture of such shapes, to carry the load of the pipe to the ground. Preferably, the outer wall includes a plurality of outer wall sections 50, spaced apart by the intermediate spacing webs 60. In the fourth embodiment (and those of FIGS. 22-33), each outer shaped wall section 50 includes a pair of wall portions 52 and an intermediate connecting web 54. The wall portions 52 are generally flat, or slightly convex, while the connecting web 54 is generally concave. This combination of shapes provides each outer wall section 50 with a high rigidity and load bearing capacity. All joining edges between the wall portions 52 and the connecting web 54, as well as between the wall portions 52 and the spacing webs 60 are rounded to reduce stress concentrations. The inner and outer spacing webs 60 form recesses in the inner and outer support walls 30, 20, which are connected by a shoulder 42 for supporting a vertically stacked, like pipe support, which shoulder 42 is formed by a recessed section of the connection portion 40 found in the recess 101. The lower end 31 of the inner support wall 30 and the lower end 21 of the outer support wall 20 include a base flange 80 to spread the bearing load on the ground and reduce the load per unit area. The base flange 80 on the outer support wall 20 preferably extends radially outward, while the base flange 80 on the inner support wall 30 preferably extends radially inward.

The inner support wall 30 and the outer support wall 20 are joined at their upper ends 32 and 22 respectively with the connecting portion 40 to form the pipe saddle 100 for supporting a pipe (not shown). The pipe saddle 100 is structurally integrated with the shaped wall sections 50, 55 of the inner and outer support wall 30, 20 respectively. The joining corners are rounded to reduce stress concentrations. The pipe saddle 100 helps spread the bearing load on the pipe and to maintain the inner and outer support walls 30, 20 at a fixed spacing.

In the fourth to tenth embodiments, shown in FIGS. 17-41, each pairing of an outer shaped wall section 50 and the diametrically opposite inner shaped wall section 55, define, together with a section 41 of the intermediate connecting portion 40, a support pillar 51, with the top of the pillar 51 forming the pipe saddle 100. The support pillars 51 are positioned symmetrically about the central axis 150 of the inner and outer support walls. In the fourth embodiment, the outer wall 20 includes 8 outer shaped wall sections and 8 inner shaped wall sections, together forming 8 support pillars.

Thus, in the fourth to tenth embodiments, the connecting portion 40 is divided into multiple top sections, or pipe saddle portions 41 extending between the inner and outer support walls 30, 20 on top of the support pillars 51 and multiple shoulders 42 located in the recesses 101 between the support pillars 51, the width of the recesses being defined by the spacing webs 60. The top sections 41 extend on top of the support pillars 51 and together form the pipe saddle 100.

A pipe support in accordance with the present invention includes at least 3, preferably 6, more preferably 8 or more support pillars 51, which are arranged concentrically about the common axis 150.

In the fifth to tenth embodiment, the basic structure of the pipe support 10 is the same as in the fourth embodiment, except for the number of support pillars 51 and some other structural features, which will be discussed in the following.

In the fifth embodiment as shown in FIGS. 22-27, several apertures, or openings 120 are provided in the pipe support 10 to allow release of trapped air during installation, to reduce buoyancy, facilitate groundwater flow and facilitate the flow of cathodic protection current to the pipe. The pipe saddle is formed by the top sections 41, each of which is provided with an opening 120. Each top section 41 preferably has a trapezoidal or triangular shape. Six support pillars 51 are formed in this embodiment.

Figure 36:
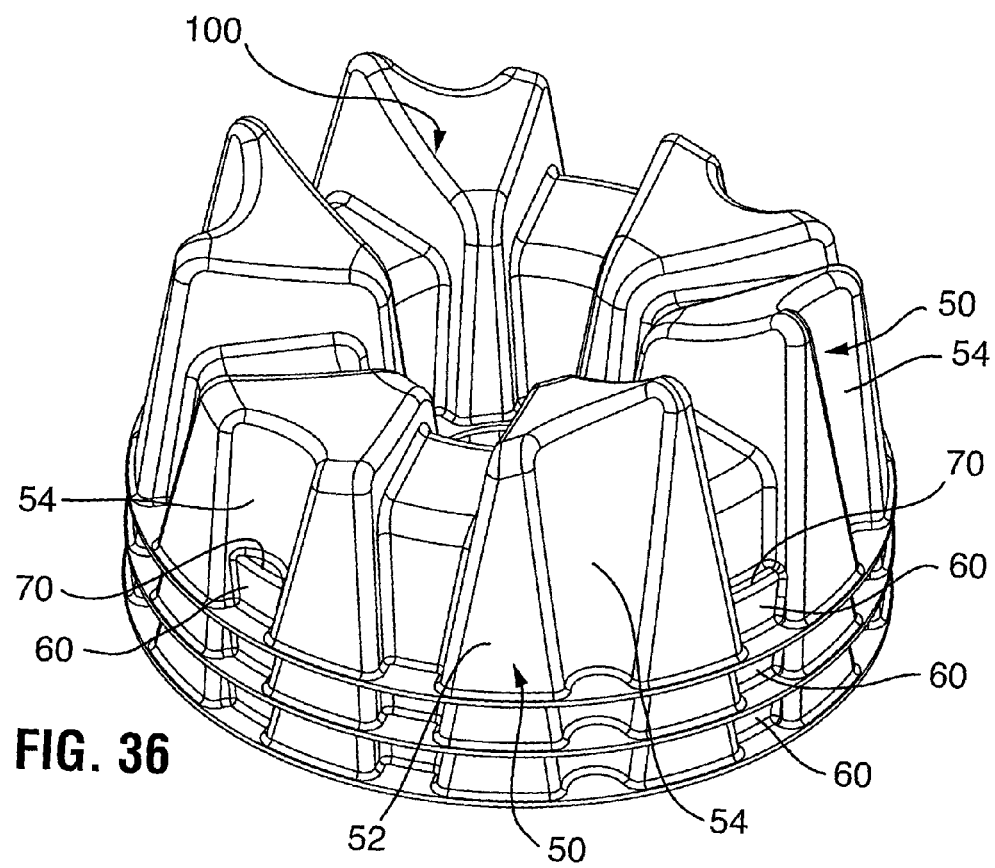
FIG. 36 is an isometric view of the pipe support of FIG. 22, in a nested configuration for storage or transport.
Figure 37:
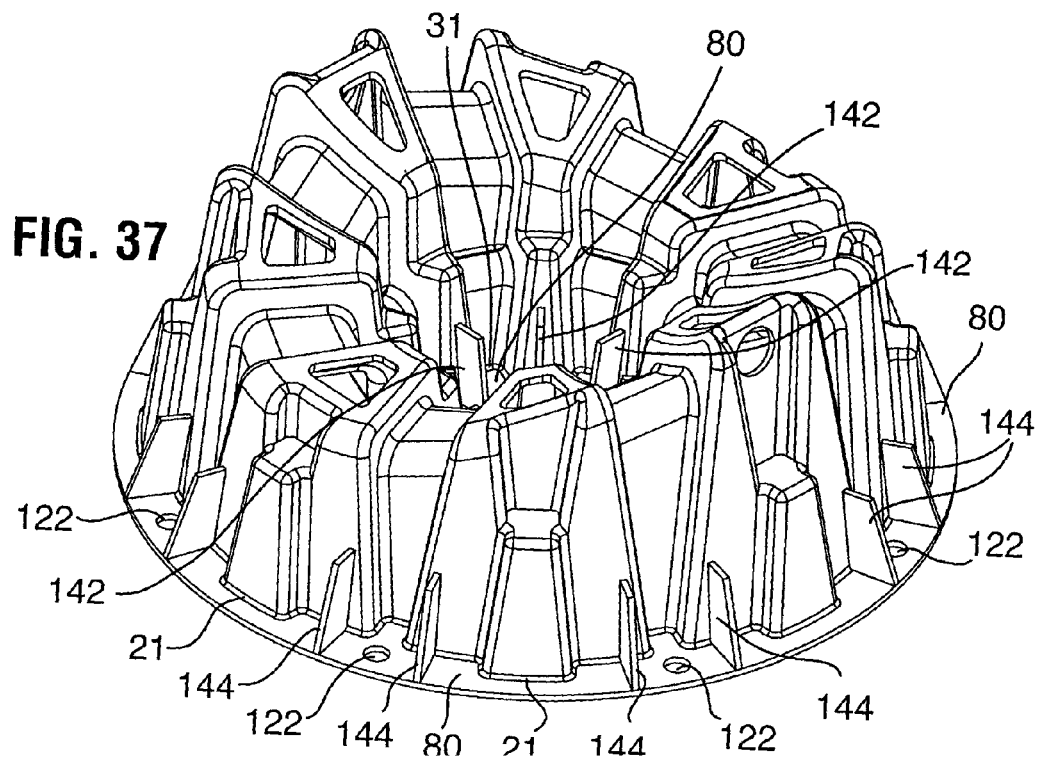
FIG. 37 is an isometric view of a ninth embodiment of a pipe support of the present invention.
Figure 38:
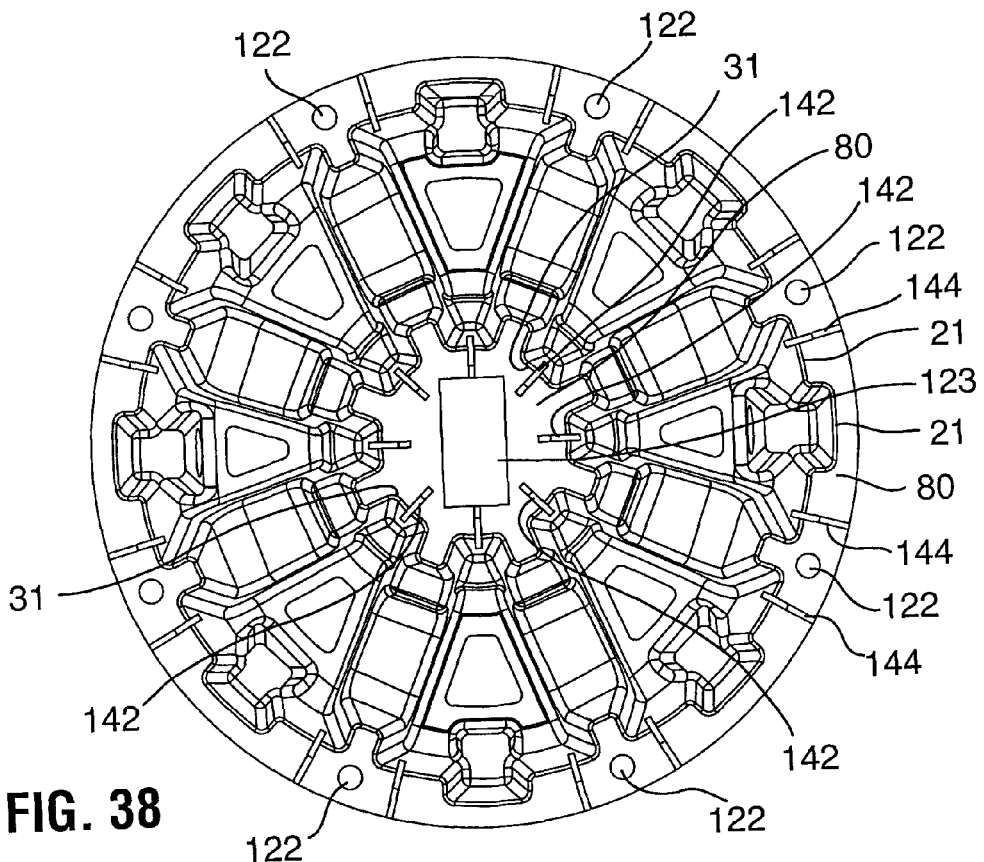
FIG. 38 is a top plan view of the pipe support of FIG. 37.
Figure 39:
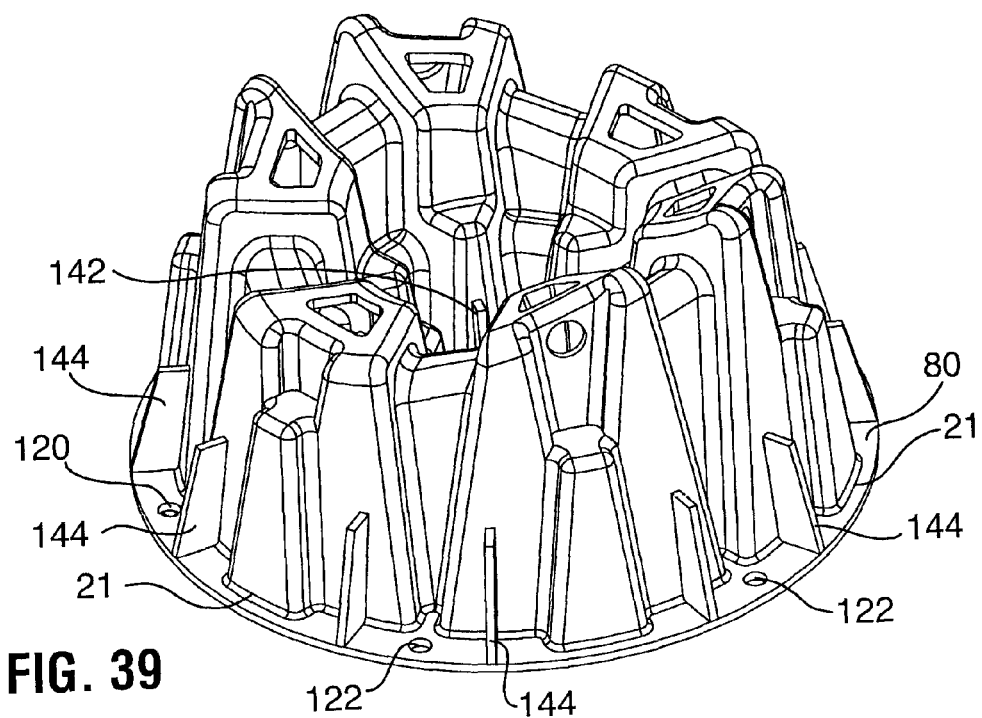
FIG. 39 is an isometric view of a tenth embodiment of a pipe support of the present invention.
Figure 40:
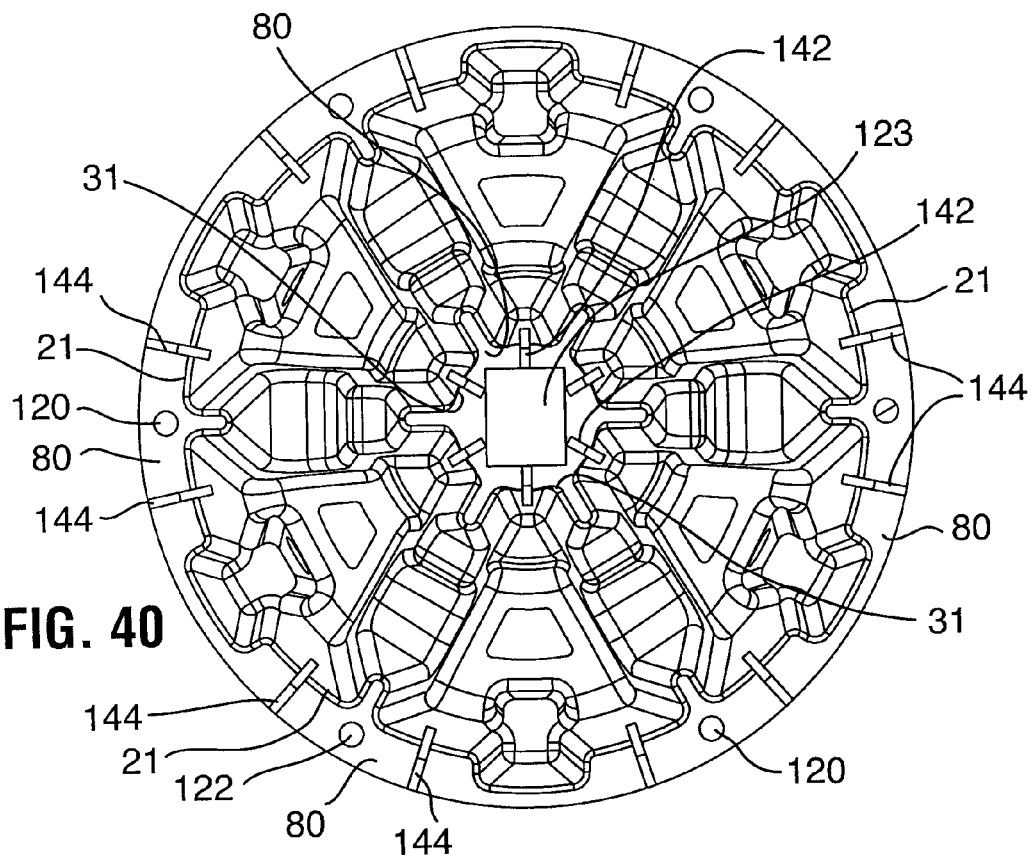
FIG. 40 is a top plan view of the pipe support of FIG. 39.
Figure 41:
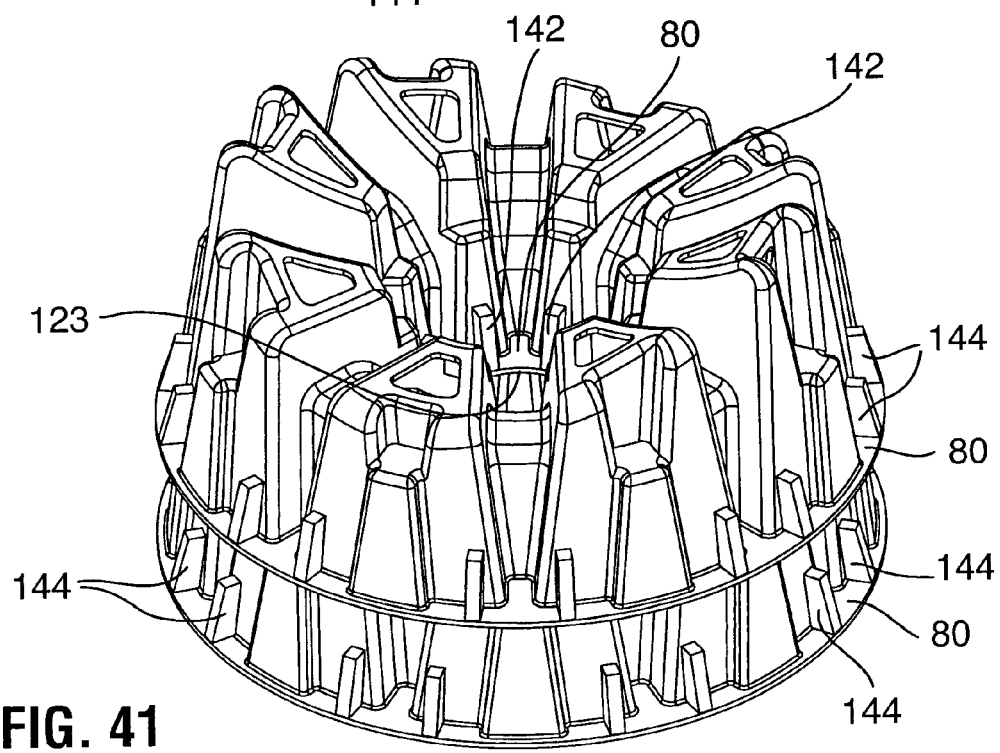
FIG. 41 is an isometric view of the pipe support of FIG. 39 in a nested configuration for storage or transport.
Figure 42:
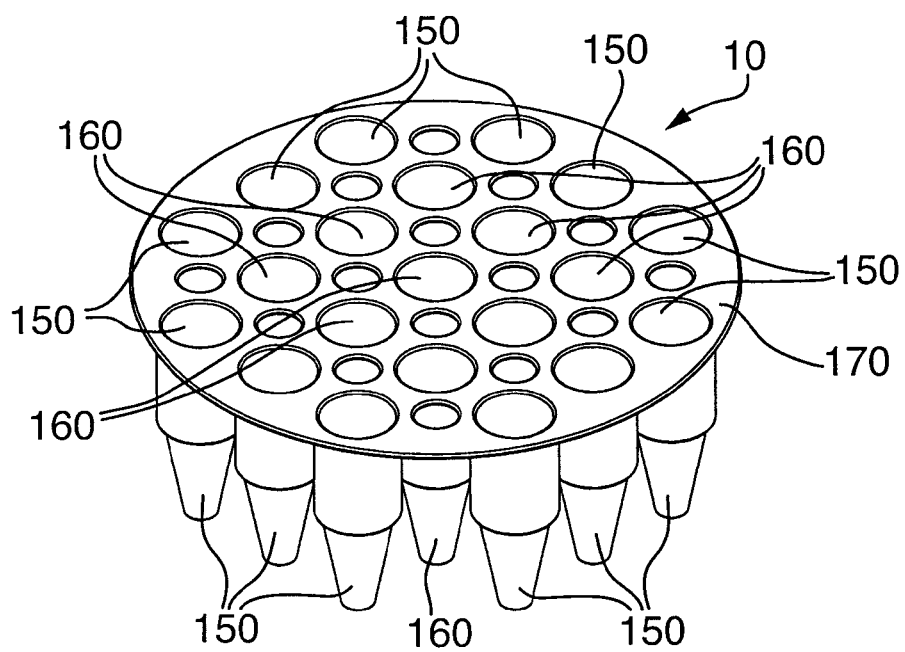
FIG. 42 is an isometric top view of an eleventh embodiment of a pipe support of the present invention.
Figure 43:
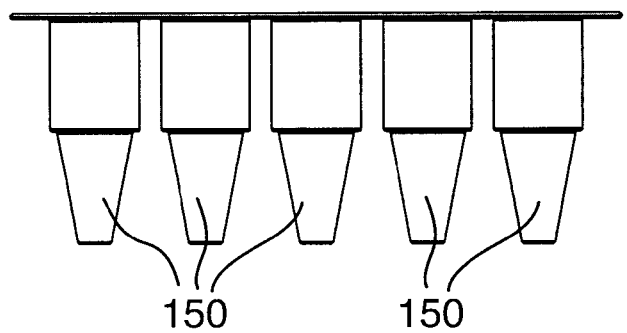
FIG. 43 is a front view of the pipe support of FIG. 42.
Figure 44:
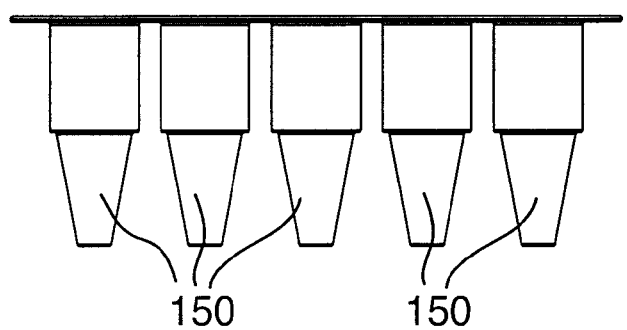
FIG. 44 is a side view of the pipe support of FIG. 42.
Figure 45:
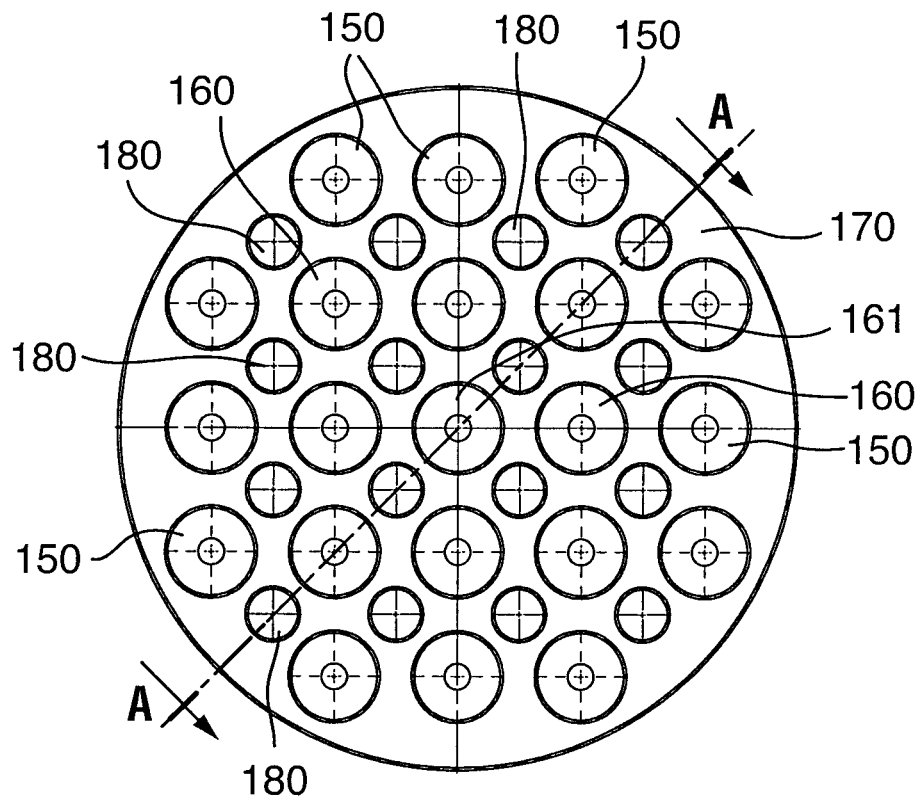
FIG. 45 is a top view of the pipe support of FIG. 42.
Figure 46:
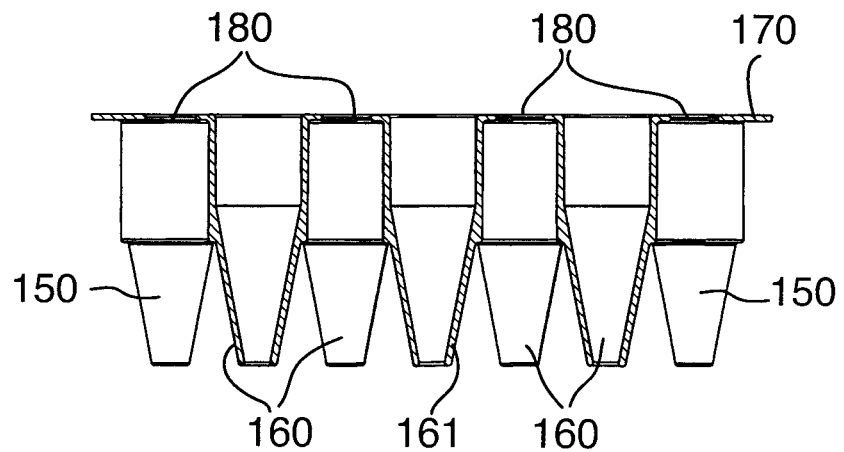
FIG. 46 is a section view of the pipe support of FIG. 45, taken along line A-A.

The pipe support 10 of the fifth embodiment further includes support stops 70 for improved elevated stacking. The support stops 70 may be formed within a shaped wall section 50, preferably within connecting web 54, or on the spacing web 60, or both (see FIGS. 22 and 25). When pipe supports 10 are stacked in an aligned manner (e.g. the shaped wall sections 50 of an upper pipe support are aligned with the shaped wall sections 50 of a lower pipe support and the orientations of the pipe saddles are aligned), the pipe supports 10 nest and stack in a relatively compact manner (similar to FIG. 36, showing three pipe supports 10 stacked vertically when aligned). However, when the pipe supports 10 are rotated (about their axis 150) relative to one another, and the lower end or bottom flange 80 of an upper pipe support is received in the recesses 101 and supported on the shoulders 42 of a lower pipe support, a greater support height is provided (see FIGS. 34 and 35) showing multiple pipe supports 10 stacked. Eight support pillars 51 are formed in this embodiment.

The pipe support 10 of the sixth embodiment shown in FIGS. 28-31 further includes openings 120 in the outer shaped wall sections 52, in particular in the connecting web 54. Eight support pillars 51 are formed in this embodiment.

Figure 32:
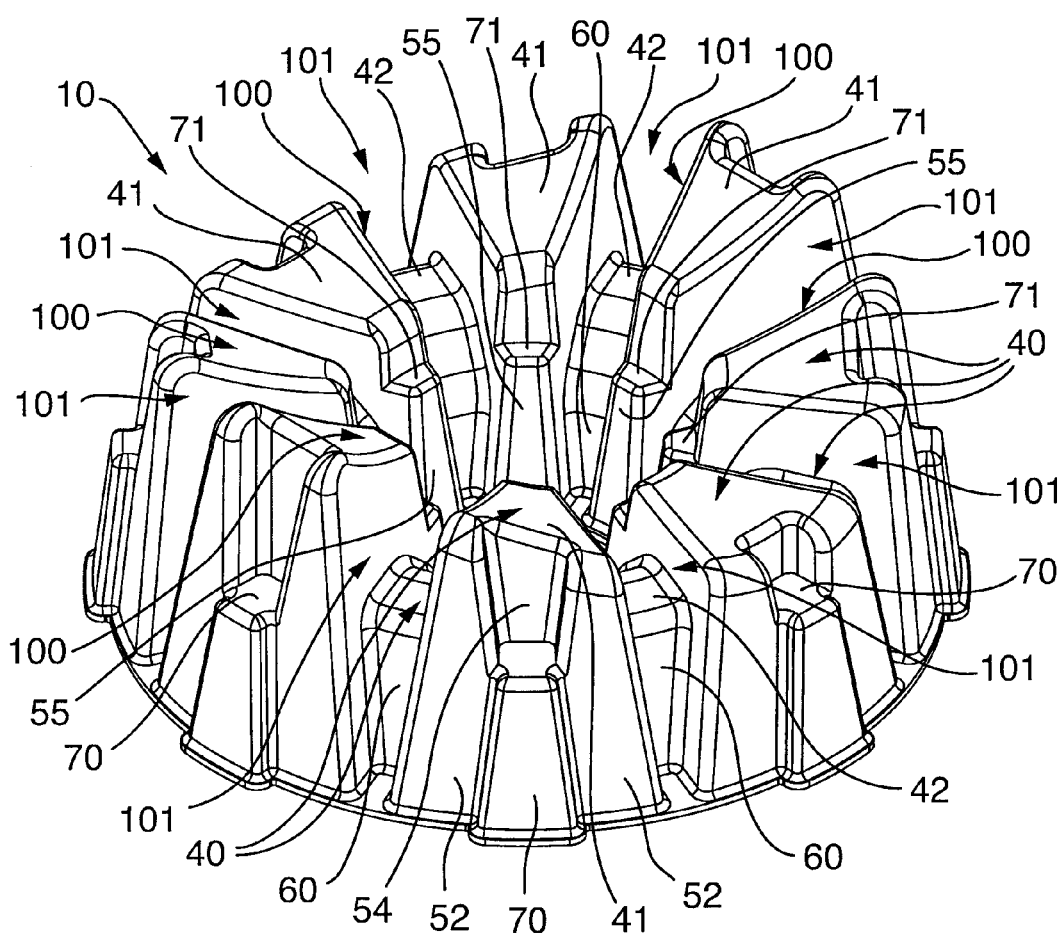
FIG. 32 is an isometric top view of a seventh embodiment of a pipe support of the present invention.

The pipe support 10 of the seventh embodiment shown in FIG. 32, further includes inner support stops 71 for improved elevated stacking. The inner support stops 71 are formed within an inner shaped wall section 55. When pipe supports 10 are stacked in an aligned manner (e.g. the shaped wall sections 50 of an upper pipe support are aligned with the shaped wall sections 50 of a lower pipe support and the orientations of the pipe saddles are aligned), the pipe supports 10 nest and stack in a relatively compact manner (similar to FIG. 36, showing three pipe supports 10 stacked vertically when aligned), with the bottom flange 80 on the outer supporting wall 20 being supported on the support stops 70 and the bottom flange 80 on the inner supporting wall 30 being supported on the inner support stops 71.

Figure 33:
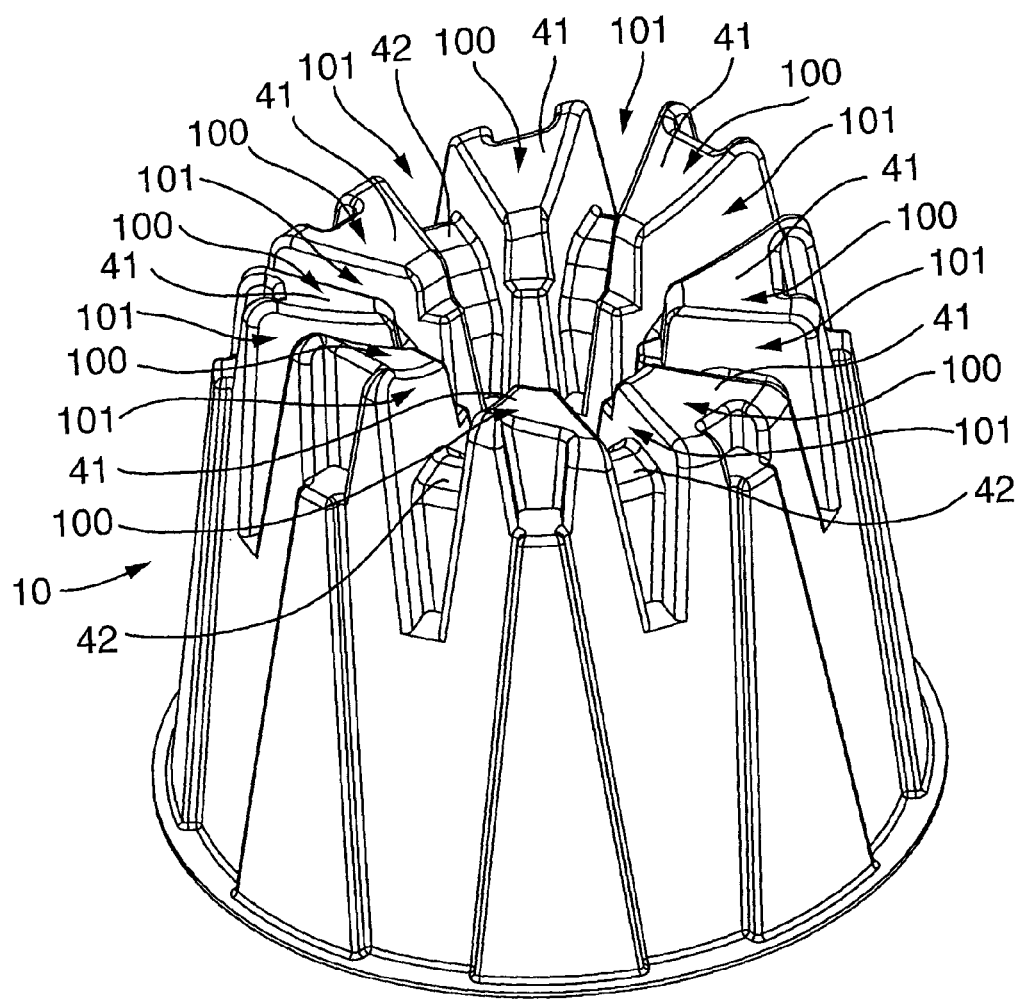
FIG. 33 is an isometric top view of an eighth embodiment of a pipe support of the present invention.
Figure 34:
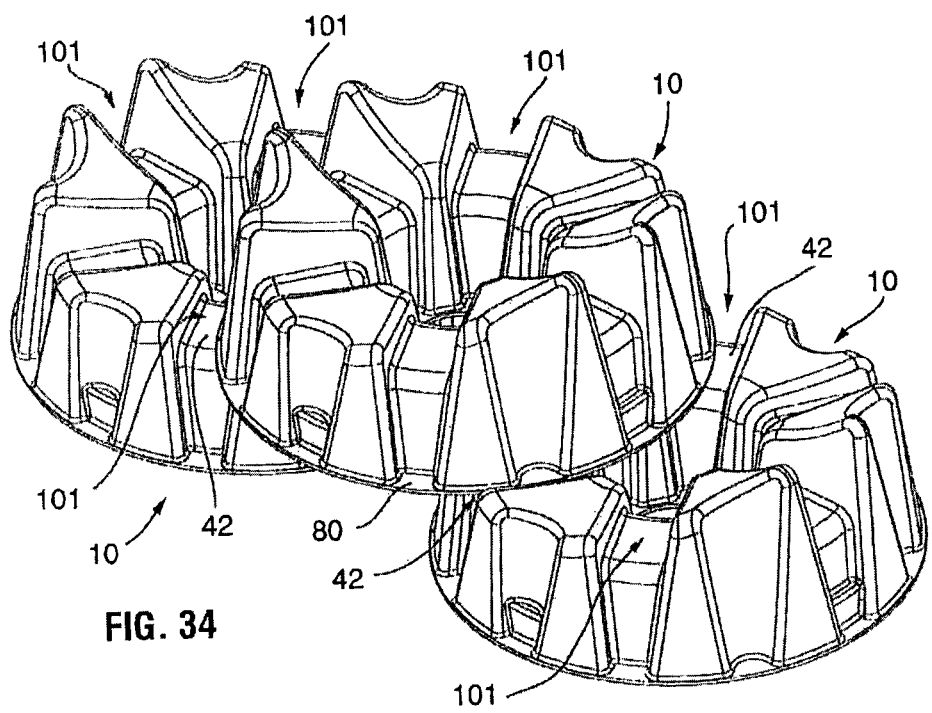
FIG. 34 is an isometric view of the pipe support of FIG. 22, in a stacked (two high) linear configuration.
Figure 35:
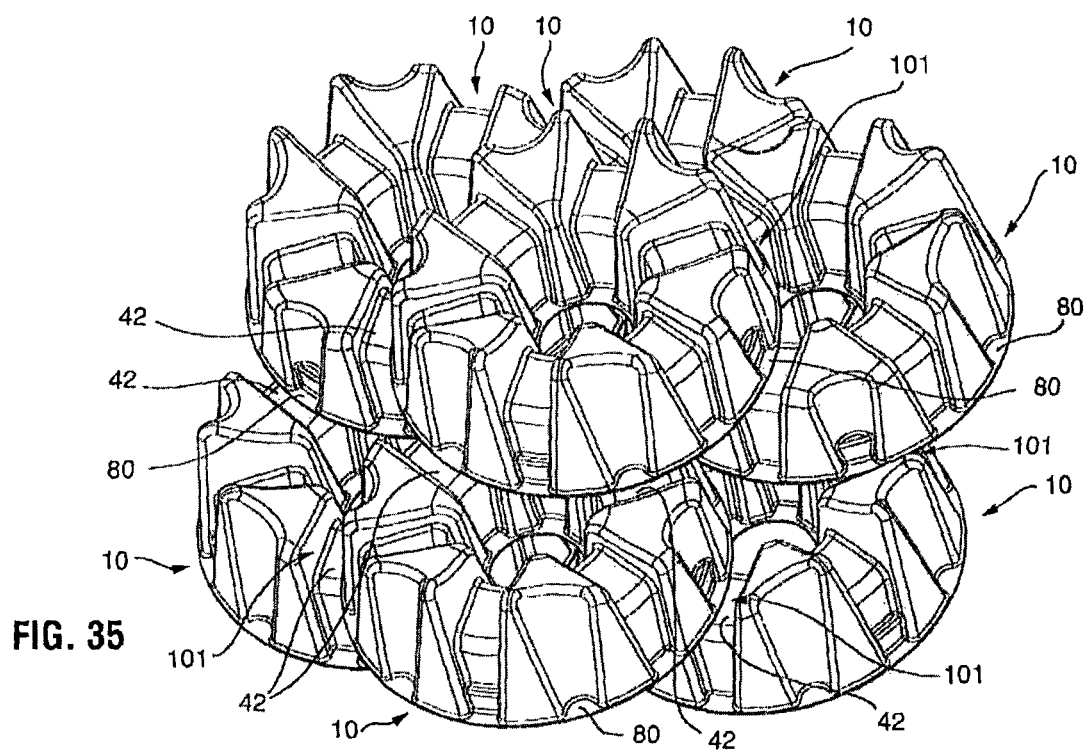
FIG. 35 is an isometric view of the pipe support of FIG. 22, in a stacked (three high) wide configuration.

The pipe support 10 of the eighth embodiment shown in FIG. 33, is of the same principle construction as the seventh embodiment shown in FIG. 32, except for the ratio of the overall height to the diameter of the pipe support. The pipe support 10 has a relatively higher profile support, adapted to support a pipeline or section of pipe at a height of between about 24" and about 48". In first to eighth embodiments of FIGS. 1 to 32, the overall height of the pipe support 10 is always less than an outer diameter of the pipe support. This makes the pipe support 10 of those embodiments very stable under load. In the eighth embodiment, the overall height of the pipe support 10 is about equal to an outer diameter of the pipe support. In general, it is preferable for the ratio of overall height of the pipe support 10 to an outer diameter of the pipe support to be a maximum of 1.

Referring to FIGS. 42-46, a ninth embodiment of the invention is shown. In this embodiment, the pipe support 10, the outer support wall is formed by an outer perimeter of tubular outer supports 150, and the inner support wall is formed by an inner perimeter of tubular inner supports 160, spaced inwardly from the outer supports 150 and the connecting portion is formed by a connecting plate 170 for maintaining the outer supports 150 and the inner supports 160 in a fixed, spaced apart relationship. As shown best in FIGS. 42 and 45, a single central inner support 161 is surrounded by an inner perimeter (shown generally square) of inner supports 160 (eight shown) and an outer perimeter (shown generally square) of outer supports 150 (twelve shown). A pipe (not shown) can be supported on the pipe saddle formed by the connecting plate 170. Several holes or openings 180 are provided in the pipe support 10 to allow release of trapped air during installation (to reduce buoyancy) and facilitate groundwater flow, and again to facilitate the flow of cathodic protection current to the pipe.

The pipe support 10 of the tenth and eleventh embodiment shown in FIGS. 37, 38 and 39, 40 respectively, further includes inner and outer reinforcing webs 142 and 144 for improved bottom rigidity of the pipe support, which means in the area of the bottom ends 31 and 21 of the inner and outer support walls 30 and 20 and the bottom flanges 80. The tenth and eleventh embodiments further include openings 122 in the bottom flange for the insertion of anchors (not shown) which maintain the pipe support in place in the installed condition. In addition, the tenth and eleventh embodiments include a shaped (preferably quadrilateral) installation opening 123 formed by the bottom flange 80 on the inner support wall 30. The shaped installation opening 123 is used for rotationally controlled installation of the pipe support 10 as will be described in the following.

Figure 48:
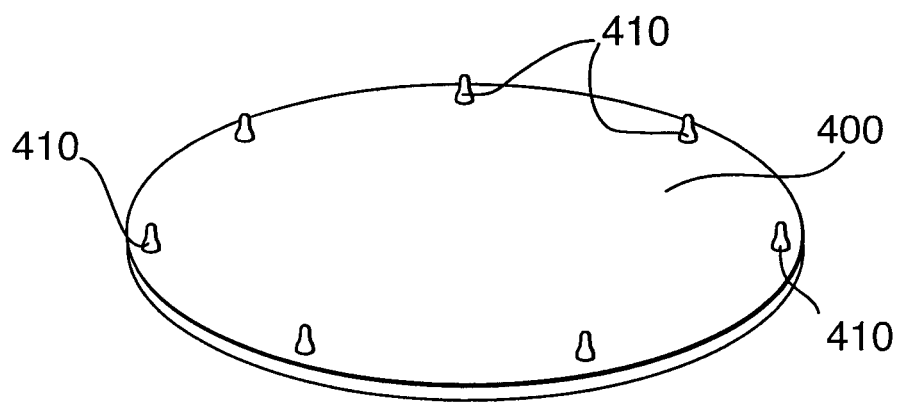
FIG. 48 shows a support plate for use with the pipe support of FIGS. 1-41.

The pipe support of the invention may be further provided with a support plate 400 (see FIG. 48) which is either separate and mounted to the support, or integral with the bottom flanges 80, in order to increase the ground engaging area or footprint of the pipe support. This will lower the amount of weight supported for each unit of surface area and, thus, the pressure per surface area exerted by the pipe support on the underlying soil, to better distribute the load in certain disturbed or unstable soils. The support plate can be a separate plate 400 as shown in FIG. 48 and include 3-10 vertical 1" nubs 410 for alignment with the pipe support. Preferably, the bottom flange 80 of the pipe support is provided with a corresponding number of openings or holes (not shown) for engagement by the nubs 410.

Figure 47:
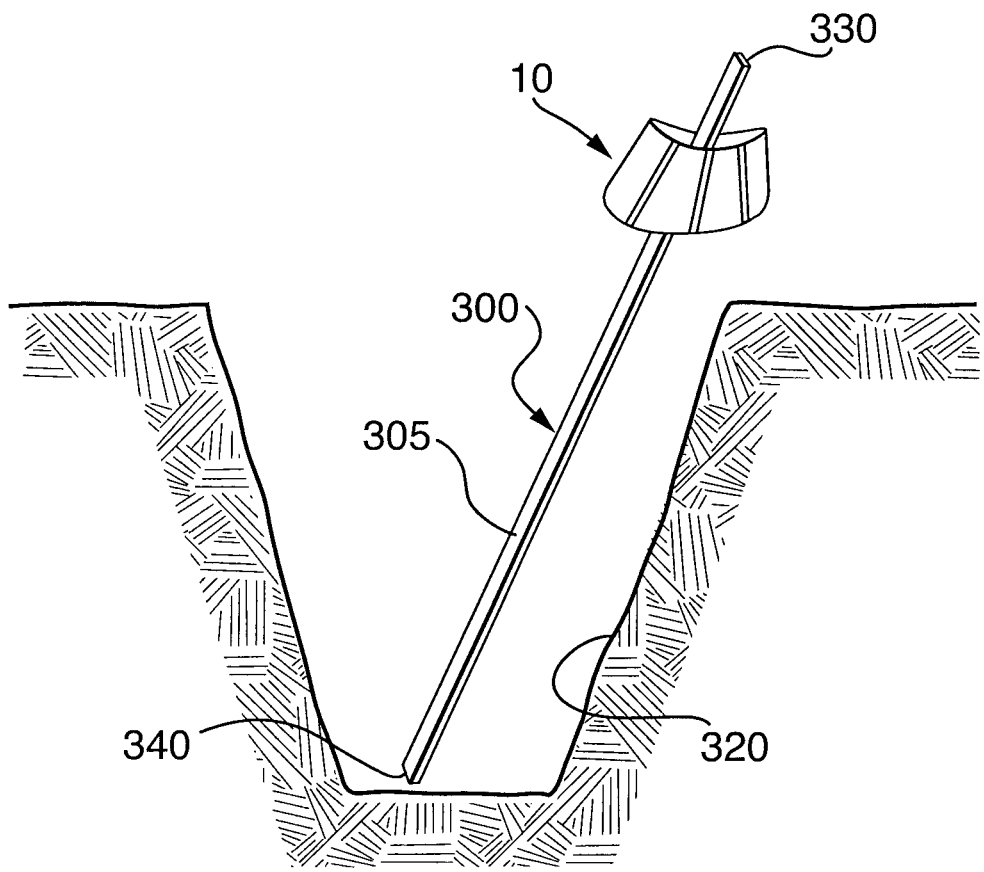
FIG. 47 illustrates a method of installing a pipe support in accordance with the invention in a pipeline trench.

During installation of the tenth or eleventh embodiment of the pipe support, as illustrated in FIG. 47, an elongated installation guide 300 of non-circular, preferably quadrilateral, cross-section (for example a 2"×4" wood stud, or an aluminum pipe or rod) and of sufficient length to extend from outside the trench to an installation location 310 of the pipe support 10 at the bottom of the trench 320 is provided. The cross-sectional shape of the installation guide 300 is selected to be complementary to the shaped opening 123 in the pipe support 10 and sized to prevent rotation of the guide in the shaped opening, while permitting the pipe support 10 to slide along the installation guide. Once an installation location is identified, an installer, while holding a user end 330 of the installation guide 300, places the opposite, installation end 340 of the installation guide in the trench 320 at the installation location 310. The body 305 of the installation guide 300 is of sufficient length to extend from the installation location 310 to outside the trench 320 to allow gripping of the guide 300 by the installer. The installer then places a pipe support 10 of the tenth or eleventh embodiment, with the shaped opening 123 first, onto the user end 330 held by the installer, and lets the pipe support 10 slide down along the installation guide 300 to the installation location. If the pipe support, once it hits the bottom of the trench, is not in a desired orientation, the installer rotates the installation guide 300 until the desired orientation is reached. The installation guide is then withdrawn. The orientation of the pipe support 10 can also be controlled by rotating the installation guide either before or during the sliding of the support along the guide. The installation guide is also useful for the controlled installation of nested supports. In a specific embodiment of the installation guide 300, the guide includes a retractable stop (not shown) at the installation one end which stop can be manually retracted by operating an actuator at the user end of the guide. With this embodiment of the guide, the end with the installation end with the retractable stop is placed in the trench and the pipe support is mounted onto the user end. This allows the installer to release the pipe support only after it was placed at the right location and in the right orientation, by operating the actuator. Of course, should the installation of the pipe support have to be aborted, the retractable stop allows the installer to remove the pipe support from the trench by raising the installation guide out of the trench.

The pipe support of the present invention may be formed by a rotational or injection molding process. High density plastics are recommended for their relatively high strength and light weight, for example a polypropylene, a polyethylene, and other types of bio or non-biodegradable plastics. The material should be designed for extended ultraviolet (UV) radiation exposure.

The pipe support of the present invention may be used both 'out of trench' or 'in trench'. The 'out of trench' uses include supporting a pipe along-side the open trench in preparation for laying the pipe, or for stockpiling pipe for storage, preparation or otherwise.

The 'in trench' uses include support of a pipeline (as described earlier). As is known to one skilled in the art the installation surface (for example, the bottom of the trench) should be relatively flat. This equally applies to the supporting surface for "out of trench" applications.

The spacing between consecutive pipe supports and the quantity used depends on the potential pipe 'sag' which relates to the pipeline diameter, weight, and product flowing.

The load design may be determined by a person ordinarily skilled in the art using commercially available load/stress software. In one design configuration, a 3 m section of 36" diameter could weigh about 1869 kg empty and 3600 kg during continuity testing (i.e. full of water), and the suitably designed pipe support would be designed to support about 10,000 kg or more. In an embodiment where the pipe support is to be used in the trench, the outer dimension of the pipe support must be sized to fit within the trench.

In one embodiment, the pipe support is a relatively lower profile support, adapted to support a pipeline or section of pipe at a height of between about 4" to 12". In one embodiment, the pipe support is a relatively larger height profile support, adapted to support a pipeline or section of pipe at a height of between about 24" and about 48".

The pipe support has been described in embodiments having two support walls. However, further support walls (i.e. the pipe support having two or more support walls) may be used to distribute and transfer loads to the ground.

The pipe support has been described in embodiments as being designed to allow improved current flow for cathodic protection, implying a steel or metallic pipeline. However, the pipe support of the present invention may be used with non-steel or non-metallic piping as well.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A pipe support for supporting a pipe section off a ground surface, the pipe support comprising:
    an outer support wall having a generally upwardly tapered frustoconical shape and a first bottom end for engaging the ground surface and a first top end;
    an inner support wall spaced inwardly from the outer support wall and having a generally downwardly tapered frustoconical shape with a second bottom end for engaging the ground surface, and a second top end, the second bottom end being spaced apart from the first bottom end;
    a connecting portion for maintaining the outer support wall and the inner support wall in a fixed, spaced apart relationship and extending between the first and second top ends the first and second top ends together with the connecting portion forming the pipe saddle;
    the pipe saddle being interrupted by at least a pair of radially extending and intersecting grooves for stacking of three or more like pipe supports in an interlocking, non-nesting and stacked relationship; and
    the inner support wall including, a plurality of spaced apart inner shaped wall sections extending between the grooves and interconnected by intermediate inner spacing webs located below the grooves and the outer support wall comprises a plurality of spaced apart outer shaped wall sections extending between the grooves and interconnected by recessed intermediate outer spacing, webs located below the grooves, and the connecting portion includes connecting: sections extending between the grooves.

2. The pipe support of claim 1, wherein each shaped wall section has a trapezoidal or triangular shape.

3. The pipe support of claim 1, wherein each of the outer shaped wall sections is upwardly tapered and at least one inner shaped wall section and at least one outer shaped wall section are connected at their tapered ends by a connecting section of the connecting portion, forming a pipe saddle portion flanked by the grooves and having a generally trapezoidal or triangular shape.

4. The pipe support of claim 1, wherein the outer support wall is a ring of spaced apart outer shaped wall sections connected by the intermediate outer spacing webs and the inner support wall is a ring of spaced apart inner shaped wall sections connected by the intermediate inner spacing webs and wherein respectively one outer shaped wall section and one diametrically opposite inner shaped wall section define a support pillar together with the pipe saddle portion extending therebetween.

5. The pipe support of claim 4, wherein the intermediate spacing webs are recessed relative to the adjoining shaped wall sections.

6. The pipe support of claim 5, wherein each recessed outer spacing web is connected to a diametrically opposite inner spacing web by a. shoulder for supporting a vertically stacked like pipe support, the shoulder being formed by a bottom of one of the grooves in the pipe saddle.

7. The pipe support of claim 1 for nesting with a like pipe support when stacked with the like pipe support in an aligned orientation wherein the shaped wall sections of the pipe support are aligned with the same shaped wall sections of the like pipe support and the pipe support further including support stops for preventing jamming of the pipe support with the like pipe support when nested.

8. The pipe support of claim 1, wherein each outer shaped wall section includes a pair of side by side wall portions connected by an interconnecting, concave wall portion, each pair of side by side wall portions being spaced from adjacent pairs by one of the recessed intermediate outer spacing webs.

9. The pipe support of claim 1, the plurality of shaped wall sections having a recess and a support stop, for receiving and supporting another pipe support stacked vertically above the pipe support.

\* \* \* \* \*

UNITED STATES PATENT AND TRADEMARK OFFICE
CERTIFICATE OF CORRECTION

PATENT NO. : 8,931,977 B2  
APPLICATION NO. : 13/700082  
DATED : January 13, 2015  
INVENTOR(S) : Geoff Weyman Connors et al.

It is certified that error appears in the above-identified patent and that said Letters Patent is hereby corrected as shown below:

In the Claims

Column 12, Claim 1, Line 43, delete "including," and insert therefor -- including --;

Column 12, Claim 1, Line 49, delete "spacing," and insert therefor -- spacing --;

Column 12, Claim 1, Line 51, delete "connecting:" and insert therefor -- connecting --; and Column 13, Claim 6, Line 9, delete "a." and insert therefor -- a --.

Signed and Sealed this
Fifteenth Day of September, 2015

Michelle K. Lee
*Director of the United States Patent and Trademark Office*